US009258778B2

(12) United States Patent
Takashima

(10) Patent No.: US 9,258,778 B2
(45) Date of Patent: Feb. 9, 2016

(54) RADIO BASE STATION AND POWER CONTROL METHOD

(71) Applicant: FUJITSU LIMITED, Kawasaki-shi, Kanagawa (JP)

(72) Inventor: Hiroaki Takashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/459,043

(22) Filed: Aug. 13, 2014

(65) Prior Publication Data

US 2015/0050962 A1    Feb. 19, 2015

(30) Foreign Application Priority Data

Aug. 16, 2013    (JP) .................................. 2013-169186

(51) Int. Cl.
*H04W 52/02* (2009.01)
*H04W 88/08* (2009.01)
(52) U.S. Cl.
CPC .......... *H04W 52/0206* (2013.01); *H04W 88/08* (2013.01)
(58) Field of Classification Search
CPC ......................... H04W 52/0206; H04W 88/08
USPC ....................................................... 455/561
See application file for complete search history.

(56) References Cited

U.S. PATENT DOCUMENTS

2001/0004604 A1 * 6/2001 Toshimitsu et al. ........... 455/562
2009/0232107 A1   9/2009 Park et al.
2009/0279495 A1  11/2009 Yoo
2012/0275366 A1 * 11/2012 Anderson et al. ............. 370/311
2014/0106759 A1 *  4/2014 Geng et al. .................... 455/444

FOREIGN PATENT DOCUMENTS

| CA | 2 722 781 A1 | 12/2009 |
| JP | 2003-37555 A | 2/2003 |
| JP | 2004-80698 A | 3/2004 |
| JP | 2011-509019 A | 3/2011 |
| JP | 2011-520376 A | 7/2011 |
| JP | 2011-524713 A | 9/2011 |

* cited by examiner

*Primary Examiner* — Michael Neff
(74) *Attorney, Agent, or Firm* — Arent Fox LLP

(57) ABSTRACT

A radio base station including: each of communication processing components being coupled to each of antennas forming each of sectors for a radio communication respectively, each of the communication processing components including communication processors being configured to perform each of functions for the radio communication and control each of radio resources for each of the functions respectively, and a control processor configured to select a first communication processing component and a second communication processing component respectively, select a first communication processor from the communication processors in the first communication processing component, transfer a radio resource of the radio resources that is controlled by the first communication processor to a second communication processor that is in the second communication processing component and performing a same function as the first communication processor, and upon transferring the radio resource of the radio resources, reduce a power of the first communication processor.

10 Claims, 18 Drawing Sheets

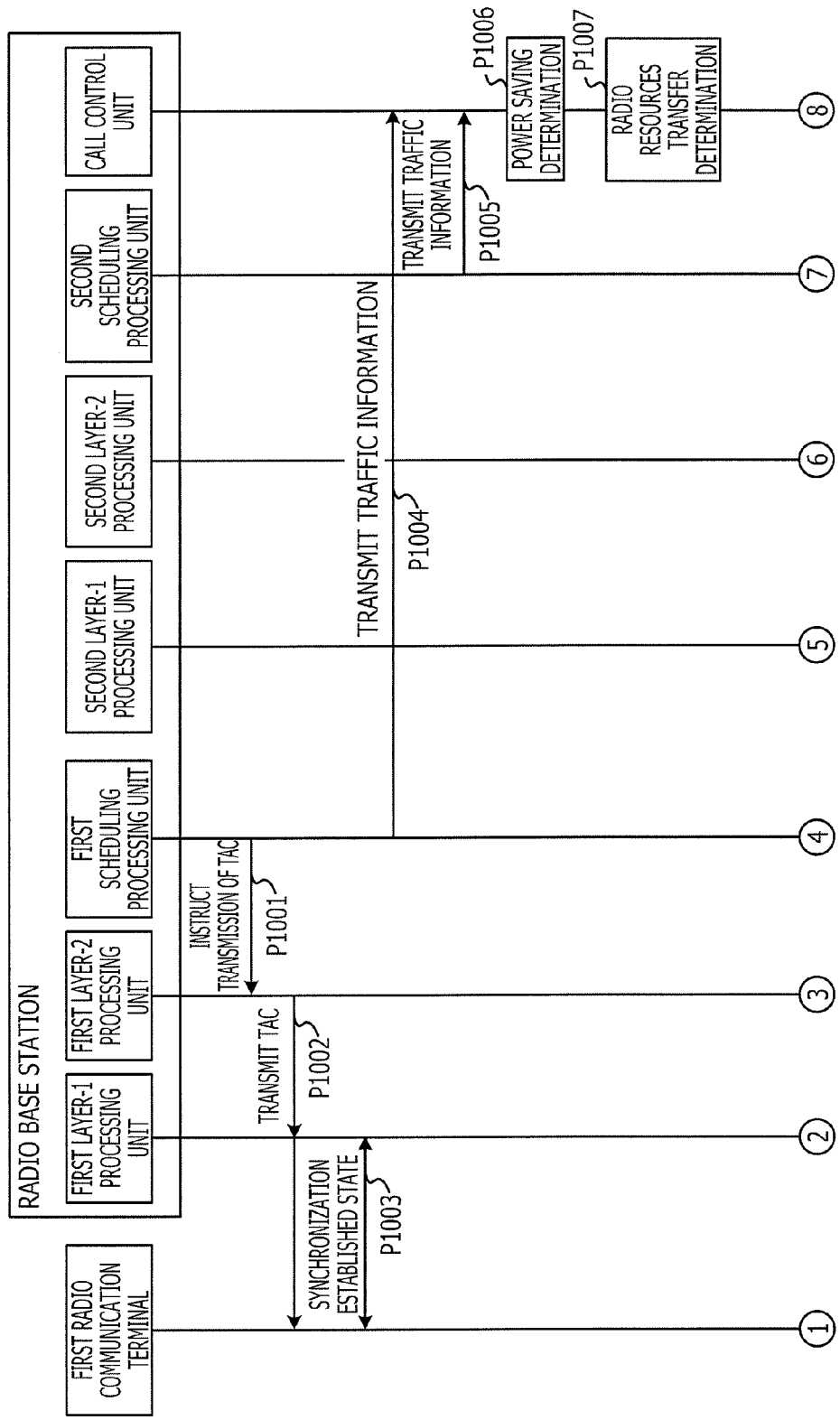

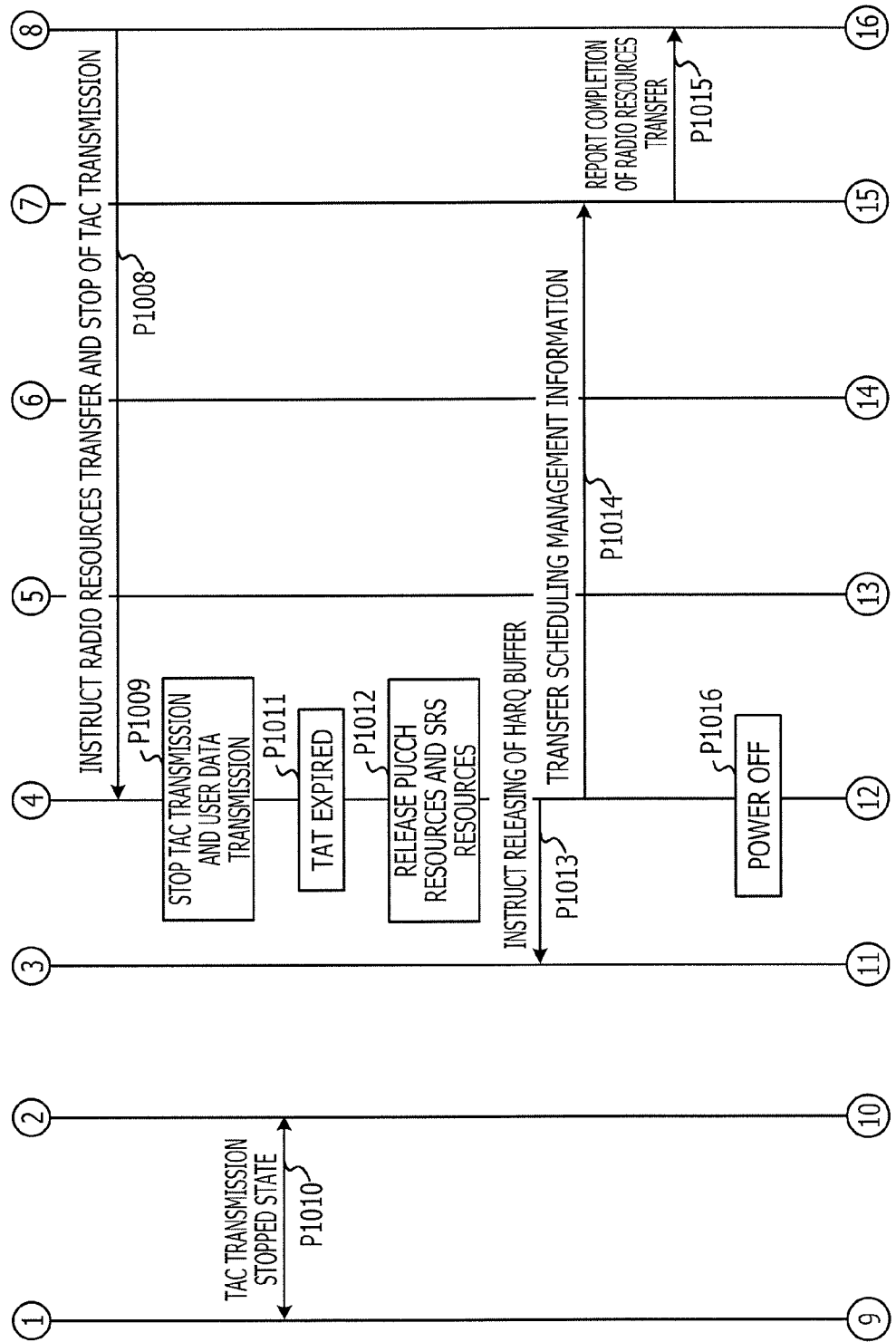

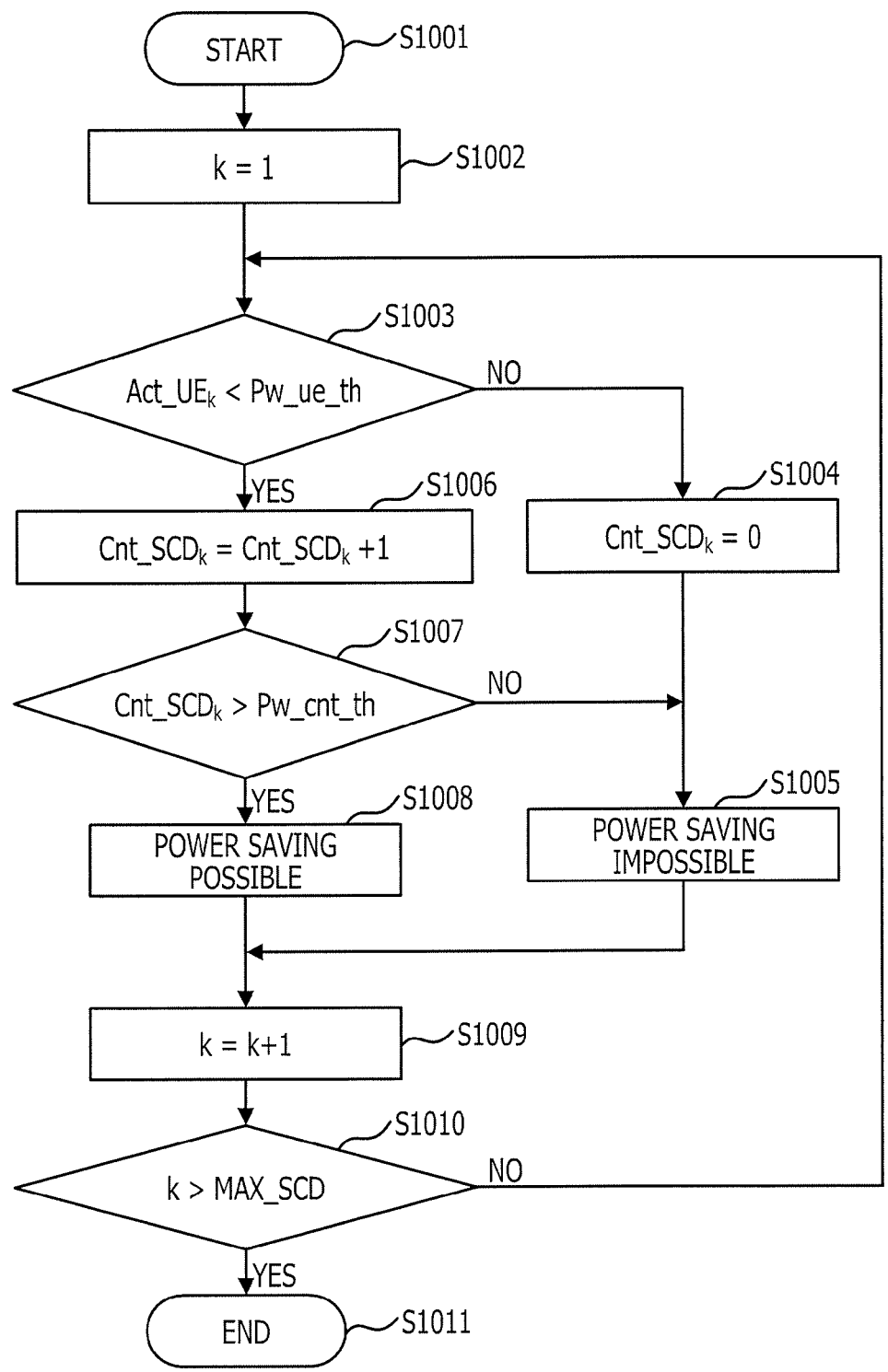

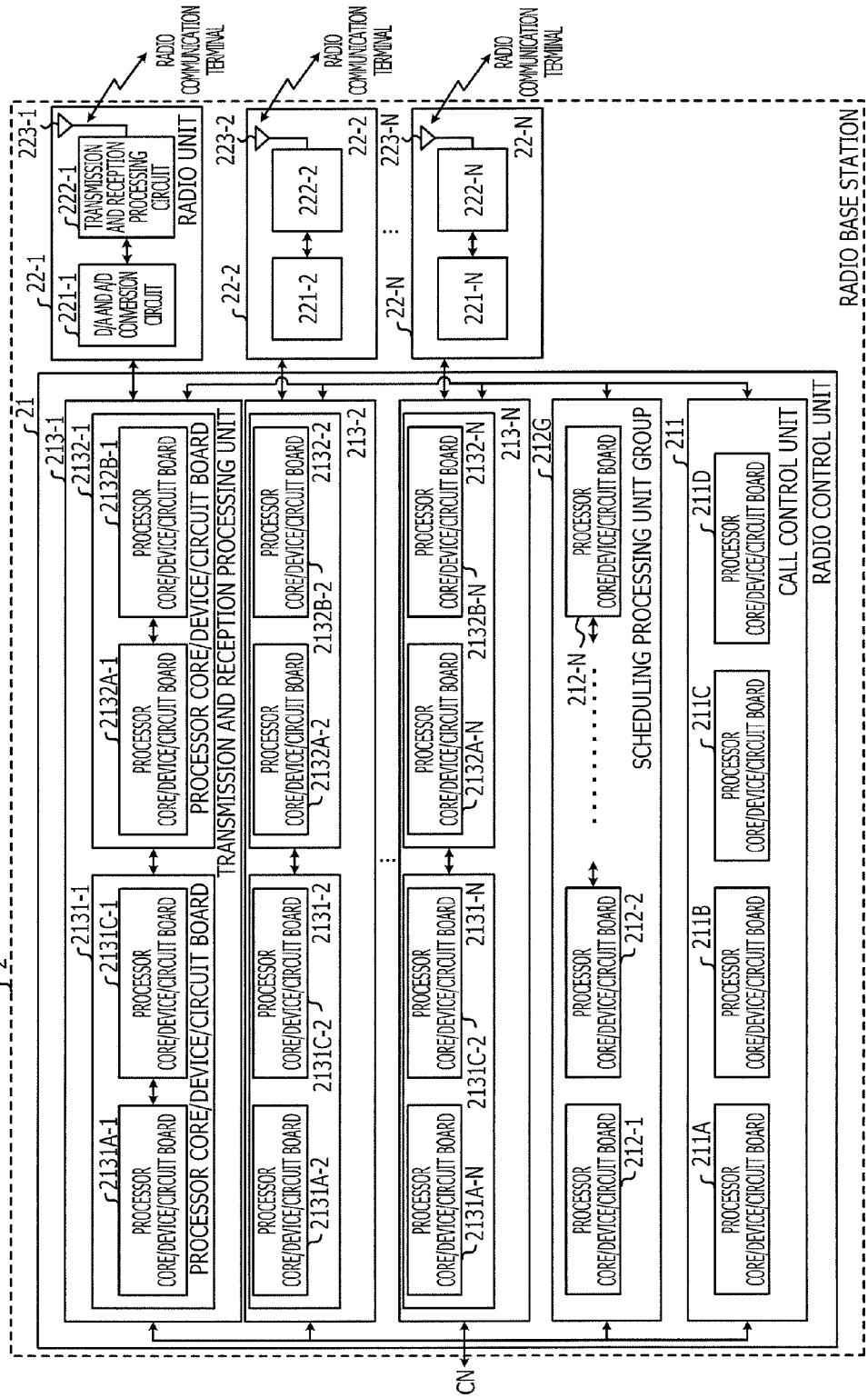

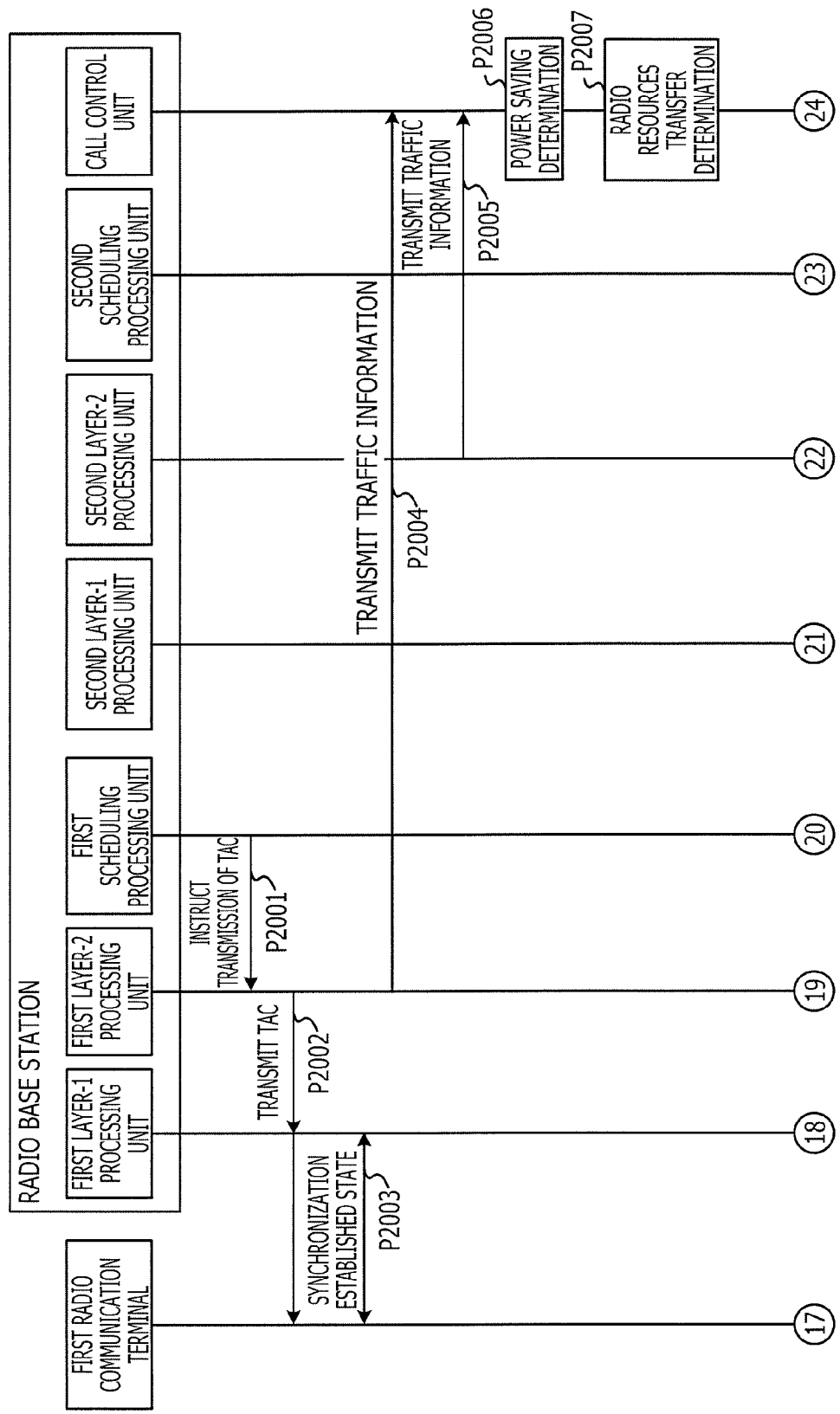

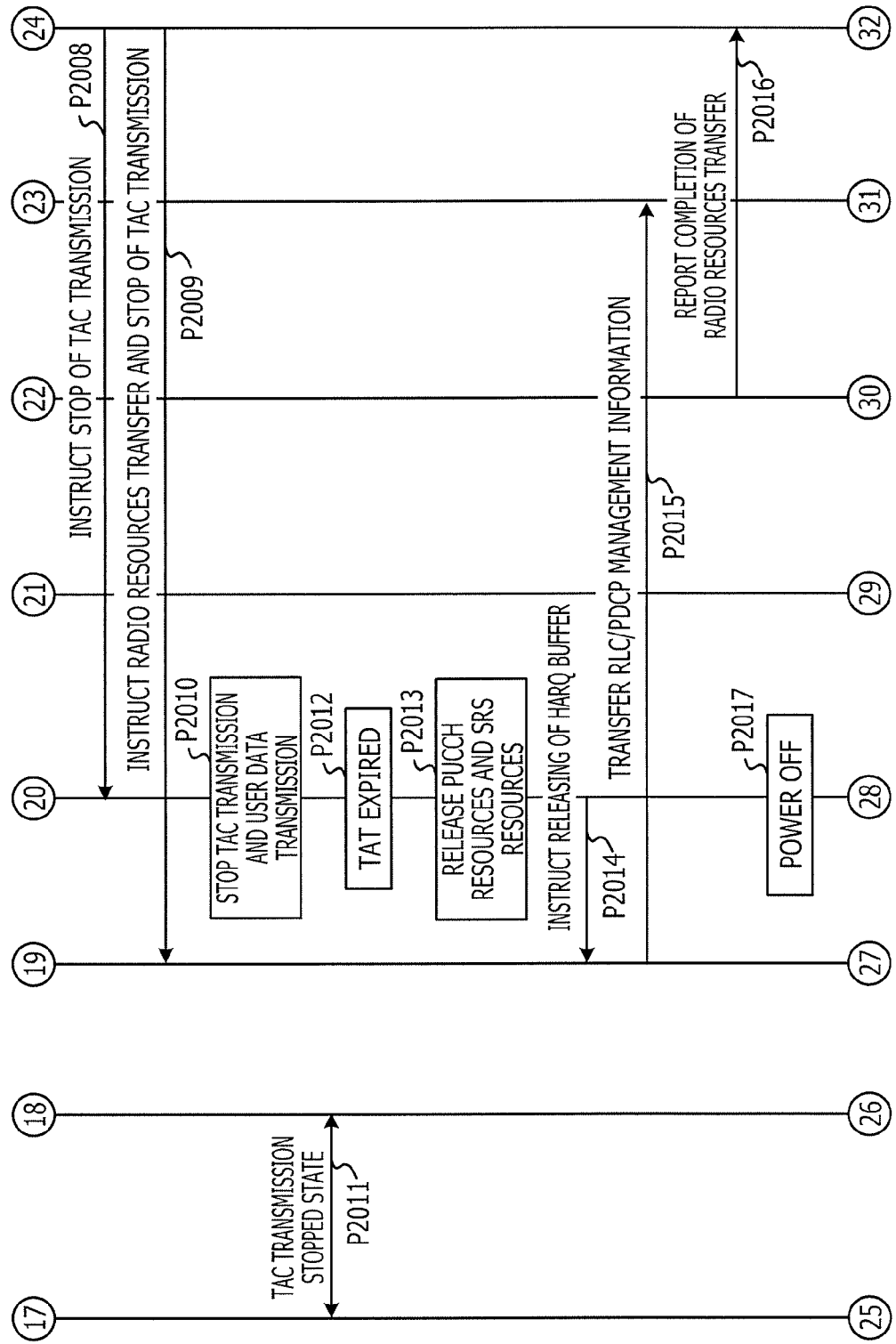

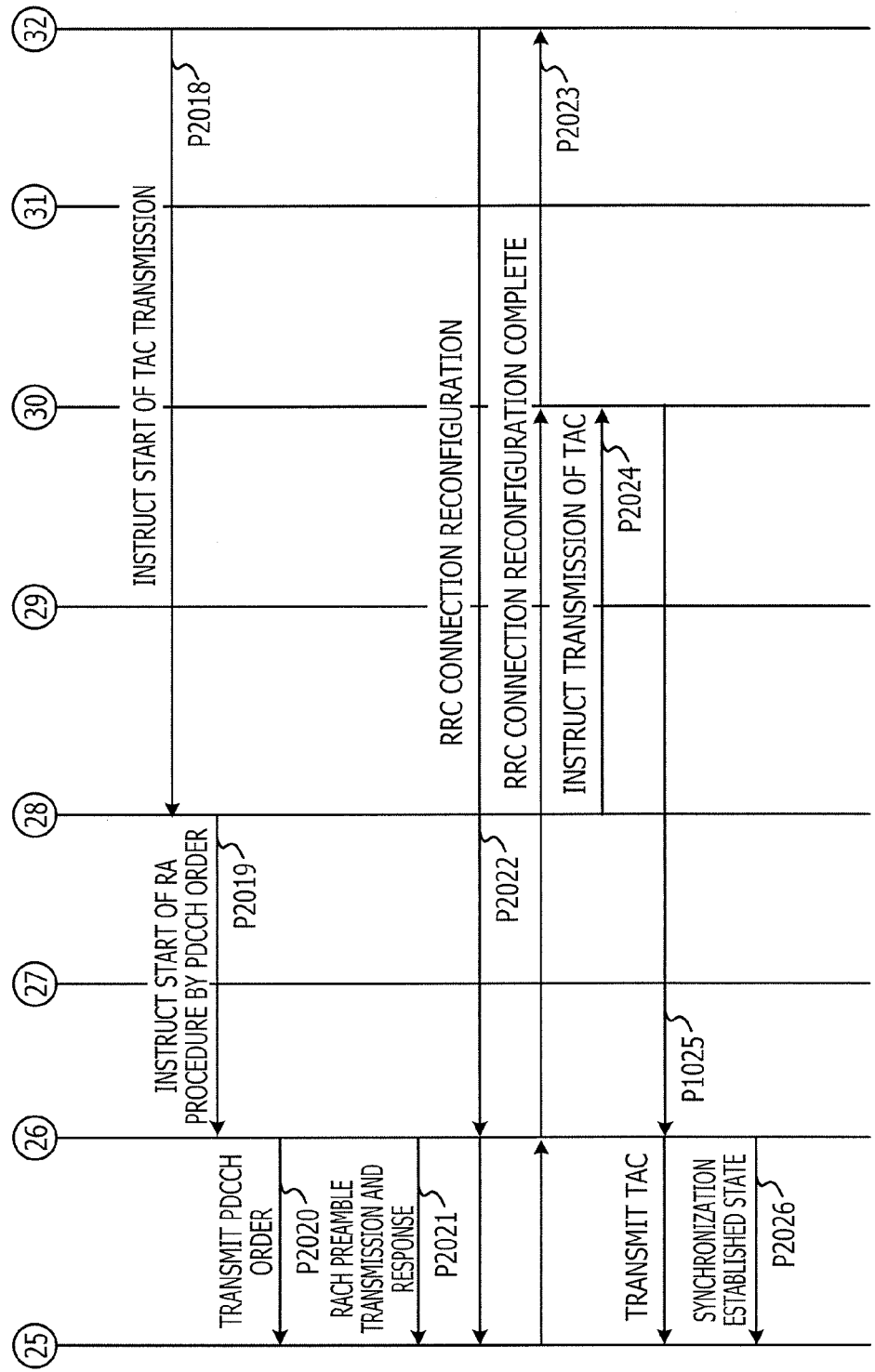

RADIO BASE STATION AND POWER CONTROL METHOD

CROSS-REFERENCE TO RELATED APPLICATION

This application is based upon and claims the benefit of priority of the prior Japanese Patent Application No. 2013-169186, filed on Aug. 16, 2013, the entire contents of which are incorporated herein by reference.

FIELD

The embodiments discussed herein are related to radio base stations and power control methods.

BACKGROUND

In recent years, power consumption by radio base stations (base transceiver station) has been increasing due in part to increase in scale of the radio base stations with increase in traffic volume in radio communication networks. For communication carriers, the increase in the power consumption by the radio base stations leads to increase in costs of maintenance and administration of their business and it is therefore desirable to reduce the power consumption by the radio base stations.

A technique using handover as follows has been known as a method of reducing the power consumption by the radio base stations. A radio base station includes a CFN generating unit configured to generate a connection frame number (CFN) that makes switching timing for hard hand over (HHO), in a call processing/maintenance processing monitor unit. When performing push out control over a call in communication, the call processing/maintenance processing monitor unit instructs the CFN generating unit to generate a CFN that makes uninterruptible HHO possible. The push out control refers to finding a new baseband resource that allows a call in communication in a relevant baseband resource to autonomously continue the communication and thereby causing the call to continue the communication by using the new resource. After receiving the instruction, the CFN generating unit generates the CFN and transfers the generated CFN information to the source baseband resource and the destination baseband resource. The source baseband resource and the destination baseband resource perform the push out control by determining timings to start and stop signal processing under the push out control based on the notified CFN.

Another technique using handover as follows has been known. When number of radio channels not in use in a radio base station is equal to or larger than a specified number and number of radio channels not in use in another radio base station which is included in control signals received from another radio base station is equal to or larger than the specified number, the former radio base station instructs a mobile station communicating with the radio base station to effect handover and brings about the handover of the mobile station to another radio base station. After verifying that the handover has normally been done, the former radio base station gradually weakens transmission power and enters into a sleep state.

There has been known another technique in which uplink is synchronized by performance of a contention-based random access procedure between a terminal (user equipment) and a base station with the terminal maintaining control resources when a time alignment timer is expired or is not operated.

There has been known another technique in which, upon transmission of common control channel (CCCH) SDU and buffer status reports (BSR) by a mobile terminal, radio resources allocated to the mobile terminal are initially allocated to the CCCH SDU and are thereafter allocated to the buffer status reports so that MAC PDU is generated and transmitted.

There has been known another technique in which a terminal stores time alignment information received from a base station in a buffer and maintains an operation of a time alignment timer which is currently running in a contention-based random access procedure and in which the terminal discards the time alignment information received from the base station in case where the terminal does not receive a contention resolution message from the base station before a contention resolution timer expires.

Japanese Laid-open Patent Publications Nos. 2004-80698 and 2003-37555 and Japanese National Publication of International Patent Applications Nos. 2011-520376, 2011-524713, and 2011-509019 are examples of related art.

SUMMARY

According to an aspect of the invention, a radio base station includes a plurality of communication processing components, each of the plurality of communication processing components being coupled to each of a plurality of antennas respectively, each of the plurality of antennas forming each of a plurality of sectors for a radio communication respectively, each of the plurality of communication processing components including a plurality of communication processors, each of the plurality of communication processors being configured to perform each of a plurality of functions for the radio communication and control each of a plurality of radio resources for each of the plurality of functions respectively, and a control processor configured to select a first communication processing component and a second communication processing component respectively from the plurality of communication processing components, select a first communication processor from the plurality of communication processors in the first communication processing component, transfer a radio resource of the plurality of radio resources that is controlled by the first communication processor to a second communication processor that is in the second communication processing component and performing a same function as the first communication processor, and upon transferring the radio resource of the plurality of radio resources, reduce a power of the first communication processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A represents an exemplary power control processing sequence diagram according to the first embodiment;

FIG. 5B represents the exemplary power control processing sequence diagram according to the first embodiment;

FIG. 6 is an exemplary power saving determination processing flow chart according to the first embodiment;

FIG. 8 is a schematic hardware configuration of the radio base station according to the first embodiment;

FIG. 9A represents an exemplary power control processing sequence diagram according to a second embodiment;

FIG. 9B represents the exemplary power control processing sequence diagram according to the second embodiment;

FIG. 9C represents the exemplary power control processing sequence diagram according to the second embodiment;

DESCRIPTION OF EMBODIMENTS

Hereinbelow, embodiments will be described in detail with reference to the accompanying drawings.

<First Embodiment>

Figure 1:
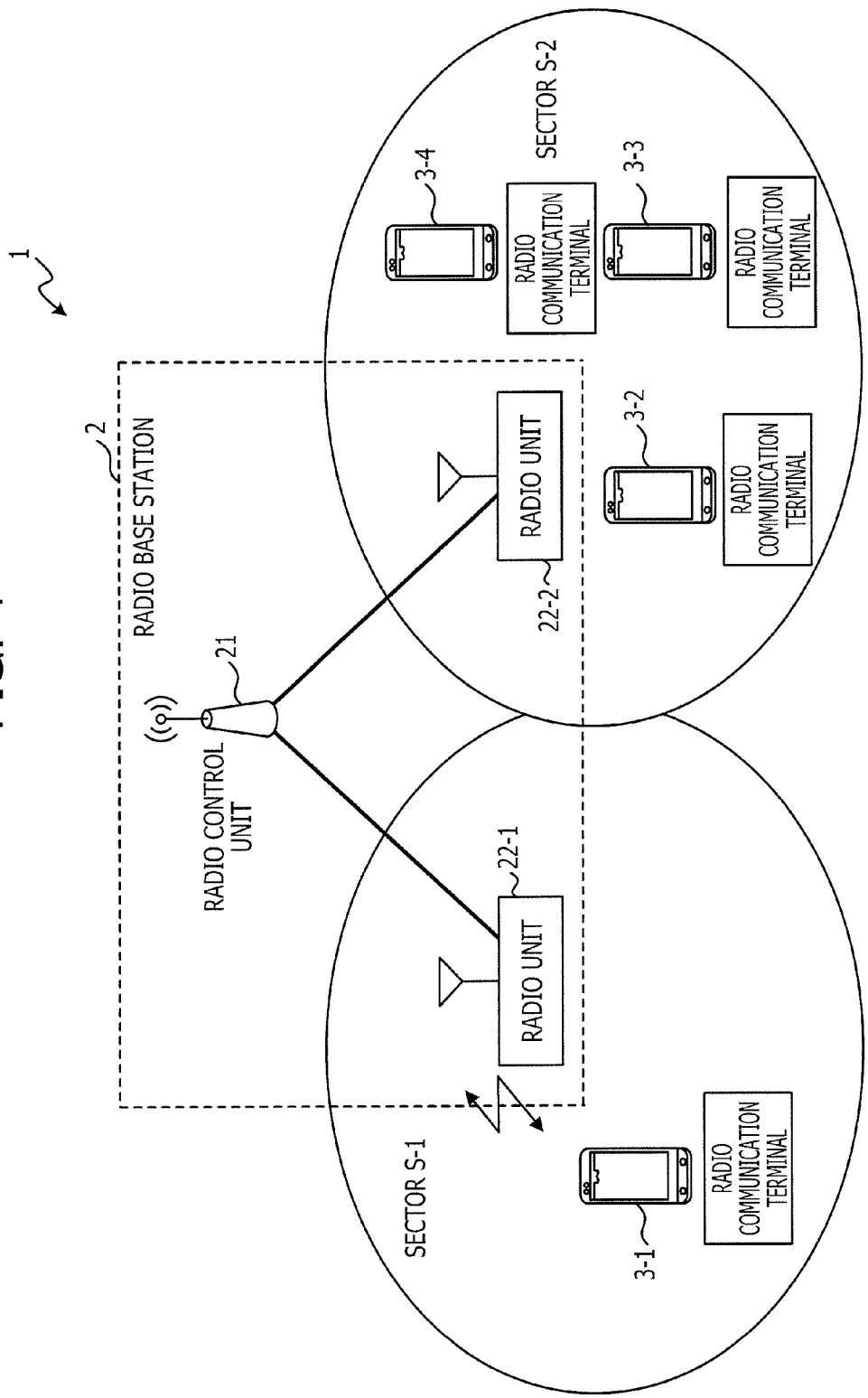
FIG. 1 illustrates an example of a radio communication system according to a first embodiment.

FIG. 1 illustrates an example of a radio communication system according to a first embodiment. As illustrated in FIG. 1, the radio communication system 1 includes a radio base station 2 and radio communication terminals 3-1 through 3-4.

The radio communication system 1 conforms to specifications of the third generation partnership project (3GPP), for instance. The radio base station 2 is an evolved node B (eNB), for instance. The radio communication terminals 3-1 through 3-4 are user equipment (UE), for instance. In description below, the plurality of radio communication terminals will be referred to as "radio communication terminals 3" when being not particularly discriminated. Though the one radio base station 2 is illustrated in FIG. 1, any desired number of the radio base stations 2 may be included in the radio communication system 1. Though the four radio communication terminals 3-1 through 3-4 are illustrated in FIG. 1, any desired number of the radio communication terminals 3 may be connected to the radio base station 2.

In the example illustrated in FIG. 1, the radio base station 2 includes one radio control unit 21 and a plurality of radio units 22-1 and 22-2. The one radio control unit 21 and the plurality of radio units 22-1 and 22-2 are connected by wirelines that conform to a prescribed specification such as common public radio interface (CPRI). Though the two radio units 22-1 and 22-2 are illustrated in FIG. 1, any desired number of the radio units may be included in the radio base station 2. In description below, the plurality of radio units will be referred to as "radio units 22" when being not particularly discriminated.

The radio units 22 are components of the radio base station 2 that transmit and receive radio signals to and from the radio communication terminals 3 and are radio remote heads (RRH), for instance. Communication area (cell) of the radio base station 2 is divided into a plurality of sectors, which correspond to the plurality of radio units 22. As illustrated in FIG. 1, each of the radio units 22 transmits and receives radio signals to and from the radio communication terminals 3 in a corresponding sector S. The radio units 22 convert baseband signals, received from the radio control unit 21, into radio-frequency signals and transmit the radio-frequency signals to the radio communication terminals 3. The radio units 22 also convert radio signals, received from the radio communication terminals 3, into baseband signals and transmit the baseband signals to the radio control unit 21.

The radio control unit 21 is a component of the radio base station 2 that performs control over the radio base station 2 as a whole and call control and is a base band unit (BBU), for instance. The radio control unit 21 modulates Internet protocol (IP) packets, received from a core network (not illustrated), into baseband signals and transmits the baseband signals to the radio units 22. The radio control unit 21 also demodulates the baseband signals, received from the radio units 22, into IP packets and transmits the IP packets to the core network. The radio control unit 21 may have a component (may be referred to as "communication processing component") configured to perform the call control and signal processing for each sector S.

As described above, the techniques that use handover have existed as the methods of reducing power consumption by radio base stations. Such techniques, however, have disadvantages as follows.

Figure 2:
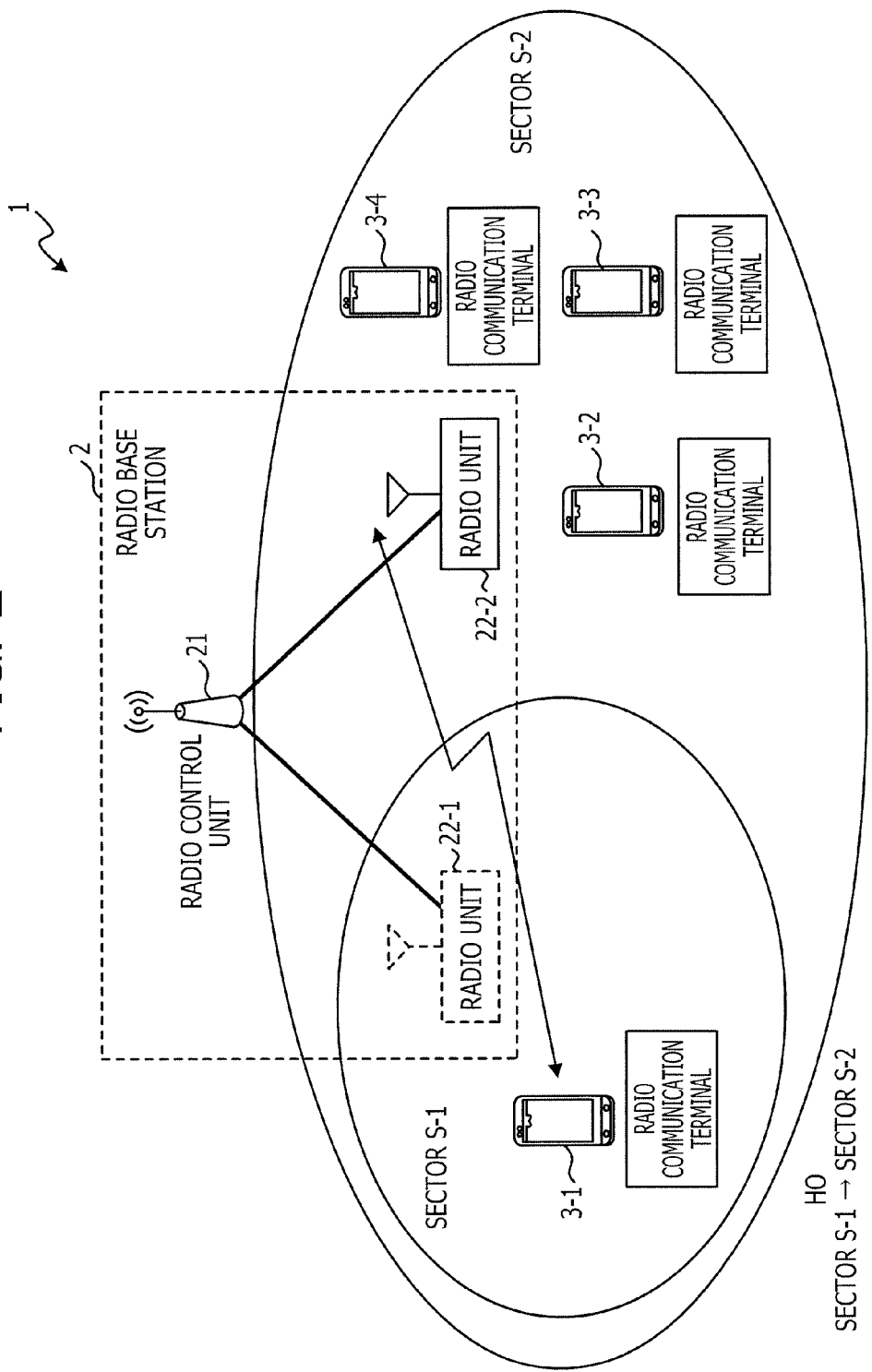
FIG. 2 illustrates a case in which handover is used for power saving in a radio base station.

FIG. 2 illustrates a case in which handover is used for power saving in the radio base station. As illustrated in FIG. 2, for instance, it is assumed that the first radio communication terminal 3-1 (FIG. 1) which is connected to the radio base station 2 through a component corresponding to the first sector S-1 is connected through a component corresponding to the second sector S-2 with performance of the handover. In the case illustrated in FIG. 2, there are no radio communication terminals 3 that are connected to the radio base station 2 through the component corresponding to the first sector S-1 including the first radio unit 22-1, after the performance of the handover. That is, for instance, radio resources in the radio control unit 21 for the component corresponding to the first sector S-1 are then in unused state. Then power saving in the radio base station 2 may be attained by shutoff of power supply to the component corresponding to the first sector S-1.

In such handover as described above, however, entire radio resources demanded for the communication of the radio communication terminal 3 that is an object of the handover are transferred from the handover source component to the handover destination component. It is therefore impossible to attain flexible power saving in the radio base station 2, such as shutoff of only power supply to some components in the radio control unit 21 that correspond to a sector S, when handover is used for the power saving in the radio base station 2.

In an example illustrated in FIG. 2, after the performance of the handover, the first radio communication terminal 3-1 is connected to the radio base station 2 through the second radio unit 22-2 located more distantly than the first radio unit 22-1 that was used before the handover. In such a case with the connection through the radio unit 22 located distantly, there is a possibility that quality of radio communication between the radio communication terminals 3 and the radio base station 2 may deteriorate after the handover.

In addition, continuance of processing sequence for the handover for long time due to consumption of long time for data transfer processing among components in the radio control unit 21 or the like causes a possibility that expiration of a management timer for radio resource control (RRC) may bring about RRC connection re-establishment due to RRC reconfiguration failure. Frequent occurrence of the RRC connection re-establishment may cause excessive access concentration, which may have an adverse effect on novel data communication connection.

Thus the use of handover for the power saving in the radio base station may entail various disadvantages. In order to overcome such disadvantages, the radio base station according to the first embodiment has such a configuration as will be described below and carries out such power control processing as will be described below.

Figure 3:
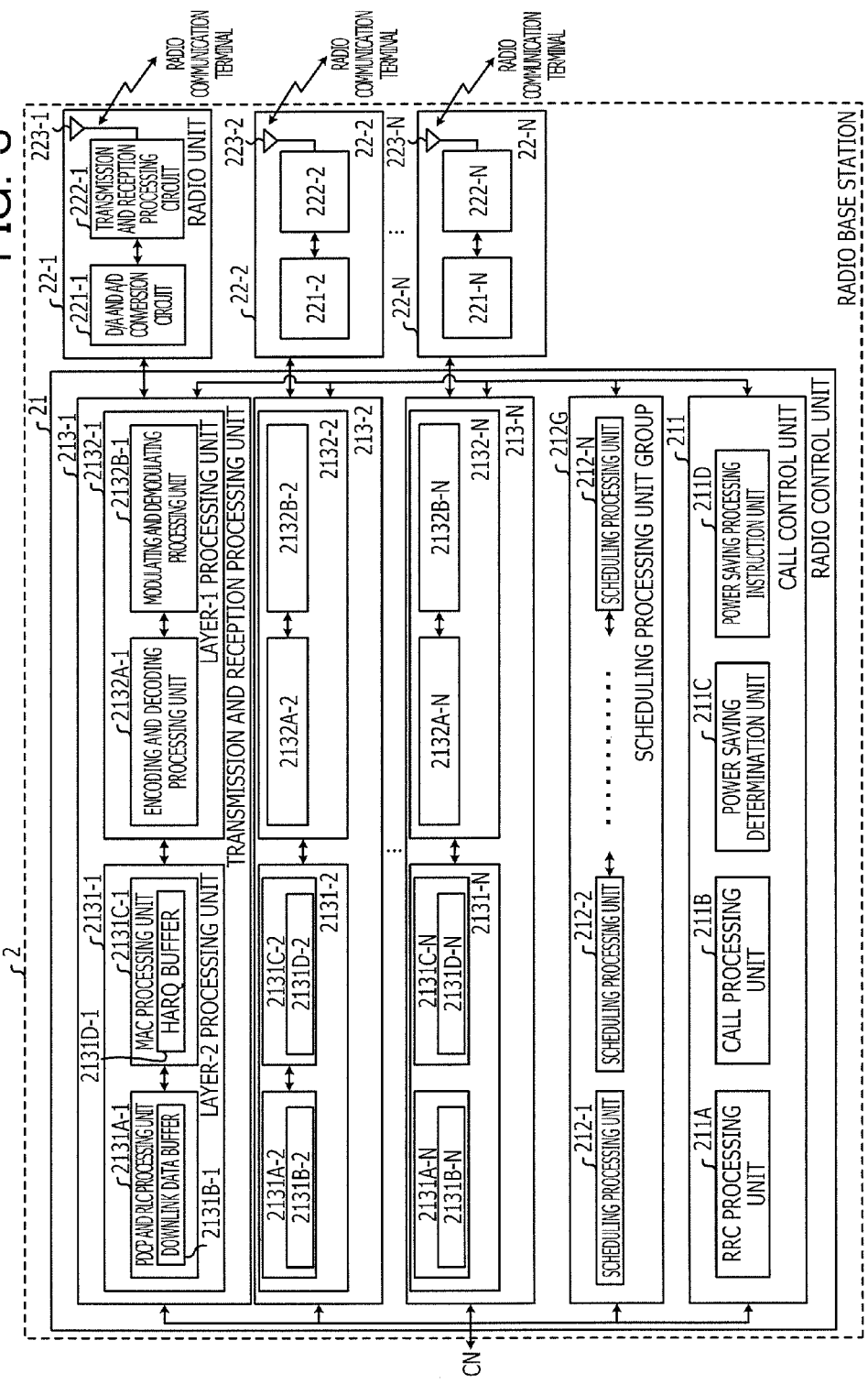
FIG. 3 illustrates an exemplary configuration of the radio base station according to the first embodiment.

FIG. 3 illustrates an exemplary configuration of the radio base station according to the first embodiment. As illustrated in FIG. 3, the radio control unit 21 of the radio base station 2 includes a call control unit 211, a scheduling processing unit group 212G, and transmission and reception processing units 213 (213-1 through 213-N) numbered in N (N is an integer equal to or larger than 2).

The call control unit 211 includes a radio resource control (RRC) processing unit 211A, a call processing unit 211B, a power saving determination unit 211C, and a power saving processing instruction unit 211D.

The scheduling processing unit group 212G includes scheduling processing units 212 (212-1 through 212-N) numbered in N. The scheduling processing units 212 may be referred to as scheduling processors. In accordance with radio communication quality data received from a radio communication terminal 3, the scheduling processing units 212 allocate radio resources that are to be used for communication with the radio communication terminal 3. In long term evolution (LTE), for instance, minimum allocation unit of radio resources is called as resource block (RB), and two-dimensional scheduling in time direction and frequency direction is carried out. The radio communication quality data is transmitted on demodulation reference signals (DM RS) and sounding reference signals (SRS) from the radio communication terminals 3 to the radio base station 2.

The transmission and reception processing units 213 numbered in N respectively include layer-2 processing units 2131 (2131-1 through 2131-N) and layer-1 processing units 2132 (2132-1 through 2132-N). The transmission and reception processing units 213 may be referred to as baseband processors. Also, layer-2 processing units 2131 and layer-1 processing units 2132 may be referred to as baseband processors. Moreover, the scheduling processors mentioned above and the baseband processors may be referred to as communication processors.

The layer-2 processing units 2131 perform processing in layer 2 (data link layer) for data signals that are transmitted to and received from the radio communication terminals 3. The processing in the layer 2 may include processing in packet data convergence protocol (PDCP) layer, processing in radio link control (RLC) layer, and processing in medium access control (MAC) layer. In the example illustrated in FIG. 3, the layer-2 processing units 2131 in the transmission and reception processing units 213 numbered in N respectively include PDCP and RLC processing units 2131A (2131A-1 through 2131A-N) and downlink data buffers 2131B (2131B-1 through 2131B-N). In addition, the layer-2 processing units 2131 in the transmission and reception processing units 213 numbered in N respectively include MAC processing units 2131C (2131C-1 through 2131C-N) and hybrid automatic repeat request (HARQ) buffers 2131D (2131D-1 through 2131D-N).

The layer-1 processing units 2132 perform processing in layer 1 (physical layer) for the data signals that are transmitted to and received from the radio communication terminals 3. The processing in the layer 1 may include processing configured to encode or decode the data signals that are transmitted to and received from the radio communication terminals 3 and processing configured to modulate or demodulate the data signals. In the example illustrated in FIG. 3, the layer-1 processing units 2132 in the transmission and reception processing units 213 numbered in N respectively include encoding and decoding processing units 2132A (2132A-1 through 2132A-N) and modulating and demodulating processing units 2132B (2132B-1 through 2132B-N).

The radio units 22 numbered in N of the radio base station 2 respectively include digital/analog (D/A) and analog/digital (A/D) conversion circuits 221 (221-1 through 221-N), transmission and reception processing circuits 222 (222-1 through 222-N), and antennas 223 (223-1 through 223-N).

In a state in which the power control processing according to the first embodiment is not performed, the scheduling processing units 212 numbered in N and the transmission and reception processing units 213 numbered in N in the radio control unit 21 respectively corresponds to the sectors S (S-1 through S-N) numbered in N into which the communication area (cell) of the radio base station 2 is divided and respectively correspond to the radio units 22 numbered in N. For instance, the first scheduling processing unit 212-1 and the first transmission and reception processing unit 213-1 correspond to the first sector S-1 and correspond to the first radio unit 22-1. The N-th scheduling processing unit 212-N and the N-th transmission and reception processing unit 213-N correspond to the N-th sector S-N and correspond to the N-th radio unit 22-N.

In processing for transmission to the radio communication terminals 3, IP packets transmitted from the core network (CN) are received by the transmission and reception processing unit 213 corresponding to the sector (or radio unit 22) where the radio communication terminal 3 that is destination of the IP packets exists. The received IP packets are accumulated in the downlink data buffer 2131B in which downlink data from the radio base station 2 toward the radio communication terminal 3 is to be temporarily stored.

The scheduling processing unit 212 chooses a radio communication terminal 3 that is to be communicated with the radio base station 2 from among the radio communication terminals 3 located in the corresponding sector. In processing of choosing of the radio communication terminal 3, modulation technique, transmission rate, and the like that are used for communication with the chosen radio communication terminal 3 are also determined.

When the received P packets are user data (U-plane data), the PDCP and RLC processing unit 2131A performs processing in PDCP layer and processing in RLC layer for the user data. When the received IP packets are control data (C-plane data), the RRC processing unit 211A performs processing in RRC layer for the control data. Then the PDCP and RLC processing unit 2131A performs the processing in the PDCP layer and the processing in the RLC layer for the control data having undergone the processing in the RRC layer. The processing in the PDCP layer may include processing in which header compression processing and secrecy processing for the user data and integrity protection processing and secrecy processing for the control data are performed to produce PDCP protocol data unit (PDU). The processing in the RLC layer may include processing that is configured to divide or integrate the PDCP PDU so as to produce RLC PDU with a length corresponding to a transport block size for each transmission time interval (TTI). The processing in the RRC layer may include processing such as setting, maintenance, and releasing of RRC connection.

The MAC processing unit 2131C multiplexes the RLC PDU into transport blocks with a size determined by the scheduling processing unit 212 and thereby generates MAC PDU. The encoding and decoding processing unit 2132A encodes the MAC PDU in accordance with an encoding ratio determined by the scheduling processing unit 212. The modulating and demodulating processing unit 2132B applies modulation processing to the encoded MAC PDU in accordance with the modulation technique determined by the scheduling processing unit 212.

The data modulated by the encoding and decoding processing unit 2132A is converted into analog signals by the D/A and A/D conversion circuit 221 and is up-converted to a radio-frequency range by the transmission and reception processing circuit 222. The analog signals up-converted to the radio-frequency range are transmitted via the antenna 223 to the radio communication terminal 3 in the corresponding sector S.

In processing of reception from the radio communication terminals 3, the transmission and reception processing circuit 222 down-converts to baseband analog signals in the radio-frequency range received via the antenna 223. The D/A and A/D conversion circuit 221 converts the analog signals in the baseband into digital signals.

The scheduling processing unit 212 chooses a radio communication terminal 3 that is to be communicated with the radio base station 2 from among the radio communication terminals 3 located in the corresponding sector. In processing of the choosing of the radio communication terminal 3, demodulation technique, transmission rate, and the like that are used for the chosen radio communication terminal 3 are also determined.

The modulating and demodulating processing unit 2132B demodulates the digital signals in the baseband in accordance with the demodulation technique determined by the scheduling processing unit 212. The encoding and decoding processing unit 2132A decodes the demodulated digital signals in accordance with a decoding ratio determined by the scheduling processing unit 212.

When the decoded signals are user data, processing in MAC layer by the MAC processing unit 2131C and processing in the PDCP layer and processing in the RLC layer by the PDCP and RLC processing unit 2131A are performed for the user data. When the decoded signals are control data, the processing in the MAC layer by the MAC processing unit 2131C, the processing in the PDCP layer and the processing in the RLC layer by the PDCP and RLC processing unit 2131A, and processing in the RRC layer by the RRC processing unit 211A are performed for the control data. The processing in the MAC layer may include processing configured to extract RLC PDU from transport blocks. The processing in the RLC layer may include processing configured to rebuild corresponding PDCP PDU from the RLC PDU. The processing in the PDCP layer may include processing in which restoration of corresponding header, secrecy cancellation, and integrity check are performed for the PDCP PDU so that IP packets are generated. The generated IP packets are transmitted to the core network.

The call processing unit 211B performs call processing such as setting, releasing, and management of various radio resources for the radio communication terminal 3.

The power saving determination unit 211C collects traffic information from the components (units) in the radio control unit 21 and determines whether power saving for the components in the radio control unit 21 may be attained or not. Though the power saving determination unit 211C is included in the call control unit 211 in the example illustrated in FIG. 3, the power saving determination unit 211C may be included in another component of the radio control unit 21 or may be an independent component in the radio control unit 21.

When the power saving determination unit 211C determines that the power saving may be attained, the power saving processing instruction unit 211D determines whether "releasing of radio communication terminal resources (resources with the radio communication terminals 3 functioning as units) in use in a component that is an object of the power saving and allocation of the released radio communication terminal resources as radio communication terminal resources not in use for another component for purpose of continuance of communication with the radio communication terminal 3" may be attained or not. In description below, "releasing of radio communication terminal resources in use in a component that is an object of the power saving and allocation of the released radio communication terminal resources as radio communication terminal resources not in use for another component for purpose of continuance of communication with the radio communication terminal 3" will be referred to as "transfer of radio communication terminal resources" for convenience. Herein, "another component" to which the radio communication terminal resources are allocated is a component of the radio base station 2 that has the same function as "a component that is an object of the power saving" has, and "a component that is an object of the power saving" is a component corresponding to a different sector.

If it is determined that the transfer of the radio communication terminal resources may be attained, the power saving processing instruction unit 211D instructs a component in the radio control unit 21 to perform power saving processing. Specifically, the power saving processing instruction unit 211D instructs the component in the radio control unit 21 that has a function of transmitting timing commands to stop transmitting the timing commands. The component that has the function of transmitting timing commands is the scheduling processing unit 212, for instance. The power saving processing instruction unit 211D instructs the component that is the object of the power saving to notify destination component for the radio communication terminal resources of data relating to the radio communication terminal 3 that is in communication.

The timing command is a command that is used for adjusting transmission timing for radio signals from the radio communication terminals 3 so that the timing with which the plurality of radio communication terminals 3 transmit the radio signals to the radio base station 2 is synchronized. For instance, the timing command is a timing advanced command (TAC) in a radio communication system that conforms to specifications of the long term evolution (LTE). The radio base station 2 calculates adjusted values of the transmission timing based on up-link signals (such as SRS) transmitted from the radio communication terminals 3 and notifies the radio communication terminals 3 of the calculated adjusted values of the transmission timing by the TAC. The up-link signals may repetitively be transmitted from the radio communication terminals 3 to the radio base station 2. In that case, the radio base station 2 repetitively generates and transmits the TAC based on the transmitted up-link signals. The transmission timing of the radio signals may vary because the radio communication terminals 3 are movable. Therefore, the TAC generated by the radio base station 2 is made effective only within a specified period in which a time alignment timer (TAT) with a count started with the transmission of the TAC is expired. If the time alignment timer is expired without generation and transmission of new TAC, the radio base station 2 releases physical uplink control channel (PUCCH) resources and SRS resources that have been allocated to the radio communication terminal 3. For resynchronization after the expiration of the time alignment timer, a random access (RA) procedure may be carried out between the radio communication terminals 3 and the radio base station 2.

In the first embodiment, the radio base station 2 releases radio communication terminal resources in a scheduling processing unit 212 and allocates radio communication terminal resources not in use in another scheduling processing unit 212 for the continuance of communication with the radio communication terminal 3. Then the radio base station 2 stops power supply to the scheduling processing unit 212 of which the radio communication terminal resources have been brought into unused state by the transfer of the radio communication terminal resources and thereby attains the power saving in the radio base station 2.

An example of a power control method according to the first embodiment will be described with further reference to FIGS. 4 through 7.

Figure 4:
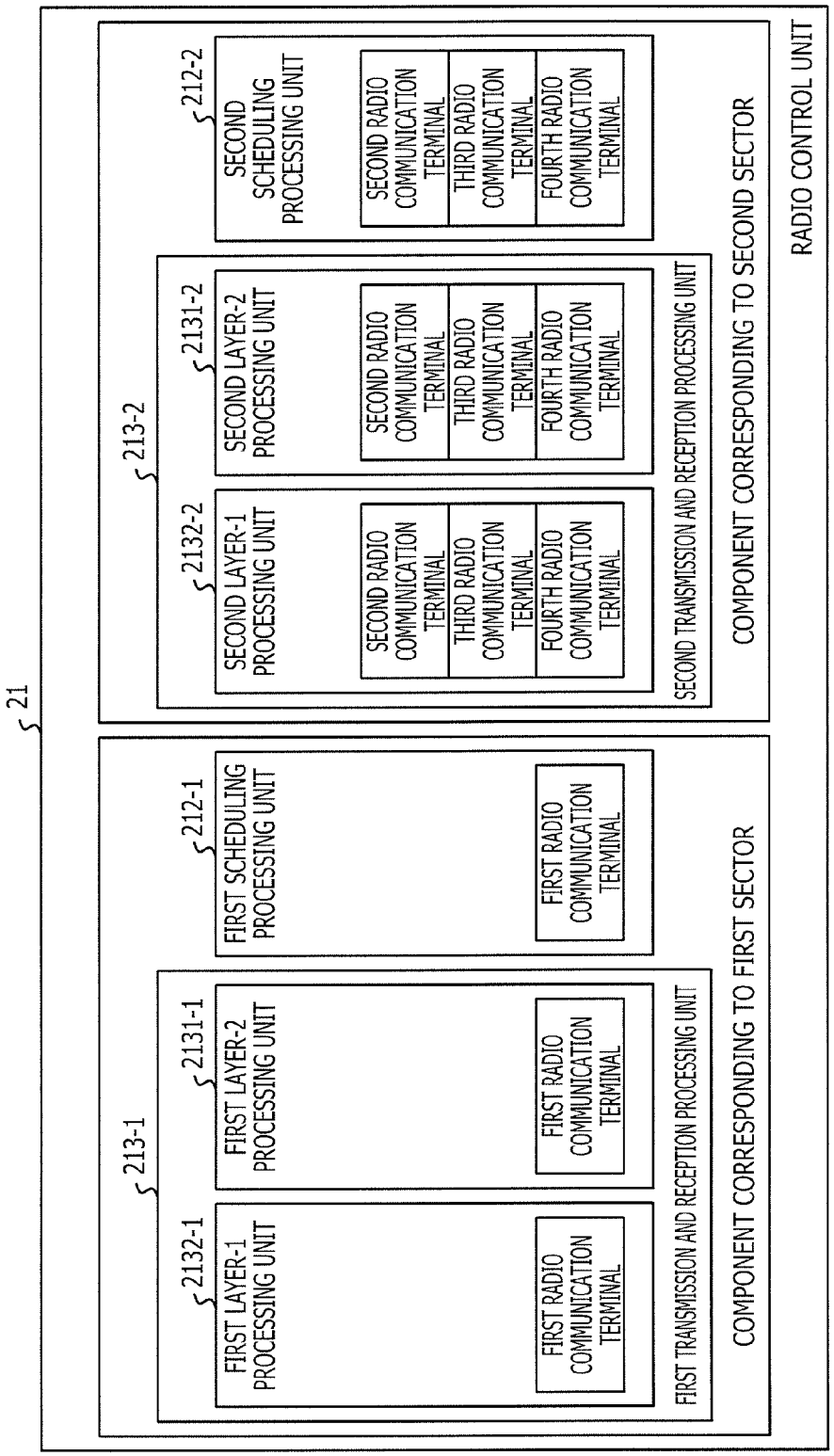
FIG. 4 illustrates radio communication terminal resources in a state before performance of power control processing according to the first embodiment.
Figure 5C:
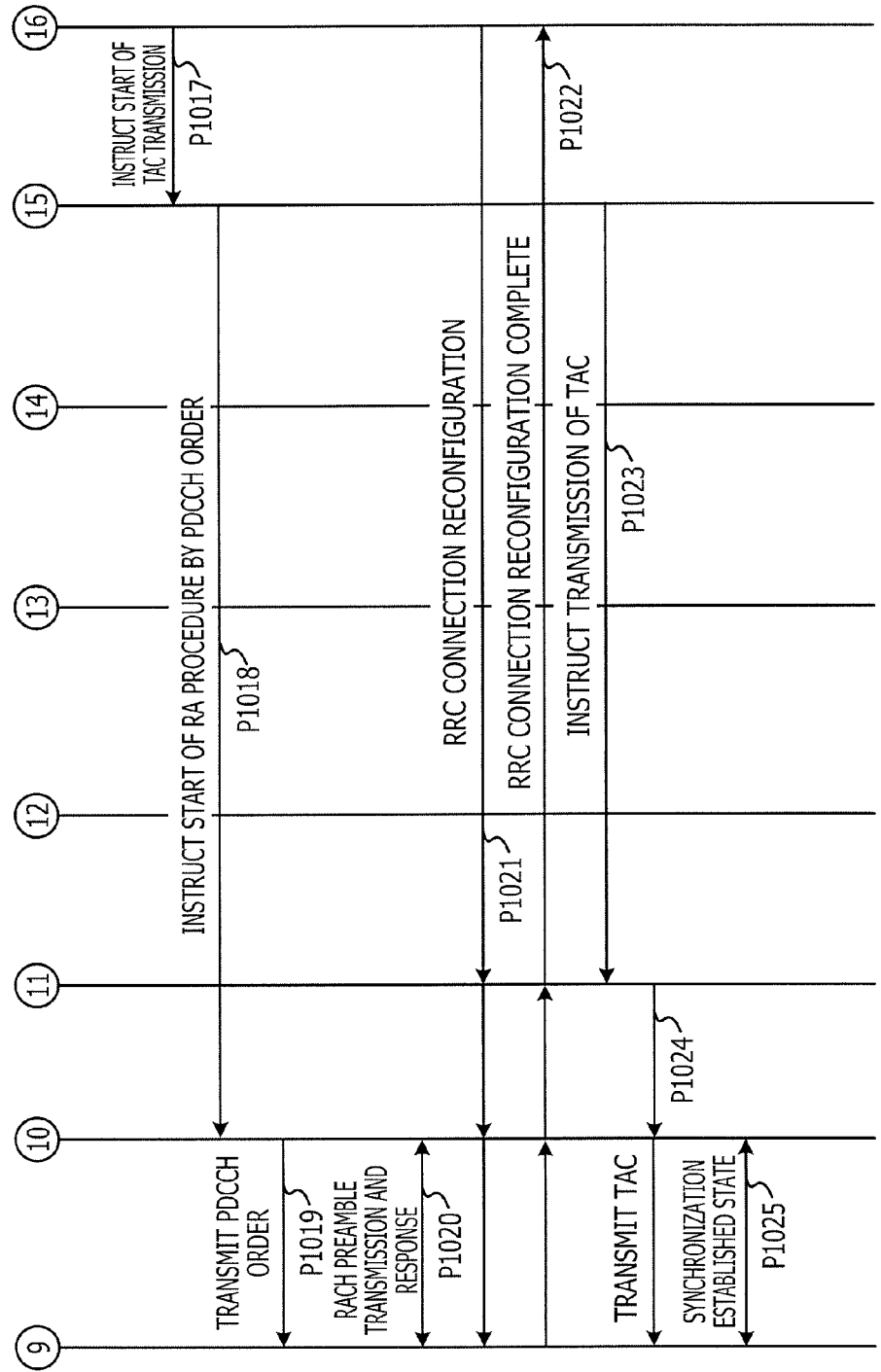
FIG. 5C represents the exemplary power control processing sequence diagram according to the first embodiment.

FIG. 4 illustrates radio communication terminal resources in a state before performance of power control processing according to the first embodiment. FIGS. 5A through 5C represent an exemplary power control processing sequence diagram according to the first embodiment.

In the example illustrated in FIG. 1, the first radio communication terminal 3-1 is connected to the radio base station 2 through the first radio unit 22-1 corresponding to the first sector S-1. The radio resources in the radio control unit 21 that correspond to the first sector S-1 are used for the call control and signal processing for the first radio communication terminal 3-1. As illustrated in FIG. 4, specifically, the radio resources in the first scheduling processing unit 212-1 and the first transmission and reception processing unit 213-1 are used. The second through fourth radio communication terminals 3-2 through 3-4 are connected to the radio base station 2 through the second radio unit 22-2 corresponding to the second sector S-2. The radio resources in the radio control unit 21 that correspond to the second sector S-2 are used for the call control and signal processing for the second through fourth radio communication terminal 3-2 through 3-4. As illustrated in FIG. 4, specifically, the radio resources in the second scheduling processing unit 212-2 and the second transmission and reception processing unit 213-2 are used.

In a state in which the radio base station 2 and the first radio communication terminal 3-1 are connected as illustrated in FIGS. 1 and 4, the first scheduling processing unit 212-1 instructs the first layer-2 processing unit 2131-1 to transmit a TAC (processing P1001 in FIG. 5A). As described above, TAC is an example of a timing command. The scheduling processing unit 212 is an example of the component that may have the function of transmitting timing commands, as described above.

The first layer-2 processing unit 2131-1 receives the instruction transmitted from the first scheduling processing unit 212-1 and transmits the TAC through the first layer-1 processing unit 2132-1 to the first radio communication terminal 3-1 in accordance with the received instruction (processing P1002). The first radio communication terminal 3-1 adjusts the transmission timing for the radio signals to the radio base station 2 in accordance with the received TAC and thereby establishes temporal synchronization (processing P1003).

The first scheduling processing unit 212-1 transmits traffic information relating to the first scheduling processing unit 212-1 to the call control unit 211 (the power saving determination unit 211C and the power saving processing instruction unit 211D) (processing P1004). The second scheduling processing unit 212-2 transmits traffic information relating to the second scheduling processing unit 212-2 to the call control unit 211 (processing P1005). The traffic information transmitted to the call control unit 211 is information for power saving determination control and is used in order for the power saving determination unit 211C to determine whether the power saving may be attained or not, for instance. In the first embodiment, the information for the power saving determination control is usage of the radio communication terminal resources, for instance, and is obtained from the following formula (1).

$$Act\_UE_k = \frac{1}{MAX\_UE_k} \sum_{n=1}^{MAX\_UE_k} Ocp\_UE_n \quad (1)$$

In the formula (1), $Act\_UE_k$ designates the usage for the radio communication terminals 3 that the scheduling processing unit 212-$k$ ($k$ is a number given to the scheduling processing unit 212 and an integer in a range from 1 to N) is capable of processing. $MAX\_UE_k$ is maximum number of the radio communication terminals 3 that the scheduling processing unit 212-$k$ is capable of processing. $Ocp\_UE_n$ represents presence or absence of occupancy for the radio communication terminal 3-$n$ ($n$ is a number given to the radio communication terminal 3 in the scheduling processing unit 212-$k$ and an integer in a range from 1 to $MAX\_UE_k$) that the scheduling processing unit 212-$k$ manages.

The power saving determination unit 211C determines whether the power saving in the scheduling processing unit 212 may be attained or not based on the traffic information received from the scheduling processing unit 212 (processing P1006). For instance, the power saving determination unit 211C repetitively performs power saving determination processing illustrated in FIG. 6 with a specified period and thereby determines whether the power saving in the scheduling processing unit 212-$k$ may be attained or not. FIG. 6 is an exemplary power saving determination processing flow chart according to the first embodiment.

Upon start of the power saving determination processing (step S1001), the power saving determination unit 211C sets the number $k$ of the scheduling processing unit 212 to 1 (step S1002) and determines whether the radio communication terminal resources occupancy $Act\_UE_k$ in the scheduling processing unit 212-$k$ exceeds a specified radio communication terminal resources occupancy threshold Pw_ue_th or not (step S1003). The radio communication terminal resources occupancy threshold Pw_ue_th is an example of a power saving determination threshold. The power saving determination threshold is a minimum usage demanded for continuance of use of the component without power saving.

If it is determined that the radio communication terminal resources occupancy $Act\_UE_k$ is equal to or larger than the specified radio communication terminal resources occupancy threshold Pw_ue_th ("NO" in step S1003), the power saving determination unit 211C sets power saving determination counter $Cnt\_SCD_k$ for the scheduling processing unit 212-$k$ to 0 (step S1004). Then the power saving determination unit 211C determines that it is impossible to attain the power saving for the scheduling processing unit 212-$k$ (step S1005).

If it is determined that the radio communication terminal resources occupancy $Act\_UE_k$ is smaller than the specified radio communication terminal resources occupancy threshold $Pw\_ue\_th$ ("YES" in step S1003), the power saving determination unit 211C increments the power saving determination counter $Cnt\_SCD_k$ for the scheduling processing unit 212-$k$ by one (step S1006). Then the power saving determination unit 211C determines whether value of the power saving determination counter $Cnt\_SCD_k$ exceeds a specified power saving counter threshold $Pw\_cnt\_th$ or not (step S1007). The power saving counter threshold $Pw\_cnt\_th$ is a threshold set for determination of continuously small usage of the radio communication terminal resources of the component.

If it is determined that the value of the power saving determination counter $Cnt\_SCD_k$ is equal to or smaller than the specified power saving counter threshold $Pw\_cnt\_th$ ("NO" in step S1007), the power saving determination unit 211C determines that it is impossible to attain the power saving for the scheduling processing unit 212-$k$ (step S1005).

If it is determined that the value of the power saving determination counter $Cnt\_SCD_k$ exceeds the specified power saving counter threshold $Pw\_cnt\_th$ ("YES" in step S1007), the power saving determination unit 211C determines that the power saving for the scheduling processing unit 212-$k$ may be attained (step S1008).

With such repetitive performance of the power saving determination processing flow with a specified period, the power saving determination counter $Cnt\_SCD_k$ is successively incremented and thus exceeds the specified power saving counter threshold $Pw\_cnt\_th$, so that the power saving determination unit 211C determines that the power saving for the scheduling processing unit 212-$k$ may be attained. In accordance with the power saving determination processing, the power saving for the component may be avoided when the usage (traffic volume) of the radio communication terminal resources temporarily decreases, and the power saving for the component may be made when the usage of the radio communication terminal resources remains continuously small.

Once the processing in step S1005 or the processing in step S1008 is performed, the power saving determination unit 211C increments the number k of the scheduling processing unit 212 by one (step S1009). Then the power saving determination unit 211C determines whether value of the incremented number k of the scheduling processing unit 212 exceeds maximum value MAX_SCD of the number of the scheduling processing unit 212 or not (step S1010).

If it is determined that the value of the incremented number k of the scheduling processing unit 212 is equal to or smaller than the MAX_SCD ("NO" in step S1010), the power saving determination unit 211C returns to the processing of step S1003 and continues the power saving determination processing.

If it is determined that the value of the incremented number k of the scheduling processing unit 212 exceeds the MAX_SCD ("YES" in step S1010), the power saving determination unit 211C ends the power saving determination processing in the period (step S1011).

The power saving determination unit 211C notifies the power saving processing instruction unit 211D of the scheduling processing unit 212 for which it is determined through such power saving determination processing as illustrated in FIG. 6 that the power saving may be made (the scheduling processing unit 212 that is an object of power saving). In the example illustrated in FIGS. 1 and 4, the radio communication terminal resources of the first scheduling processing unit 212-1 corresponding to the first sector S-1 are used only for the communication with the first radio communication terminal 3-1. In accordance with such power saving determination processing as illustrated in FIG. 6, the power saving determination unit 211C notifies the power saving processing instruction unit 211D of the first scheduling processing unit 212-1 as the scheduling processing unit 212 that is the object of the power saving.

With use of the traffic information (information for the power saving determination control) received from the scheduling processing units 212, the power saving processing instruction unit 211D compares the radio communication terminal resources in use in the scheduling processing unit 212 that is the object of the power saving and the radio communication terminal resources not in use in another scheduling processing unit 212. Then the power saving processing instruction unit 211D determines whether the transfer of the radio communication terminal resources may be attained or not (processing P1007). In the first embodiment, the "component that is the object of the power saving" in above description on "transfer of radio communication terminal" corresponds to the "scheduling processing unit 212 that is the object of the power saving" and "another component" corresponds to "another scheduling processing unit 212".

When the radio communication terminal resources in use in the scheduling processing unit 212 that is the object of the power saving are surpassed by the radio communication terminal resources not in use in another scheduling processing unit 212, the power saving processing instruction unit 211D may determine that the transfer of radio communication terminal resources may be attained. When there exist a plurality of other scheduling processing units 212 that have more radio communication terminal resources not in use than the radio communication terminal resources in use in the scheduling processing unit 212 that is the object of the power saving, the power saving processing instruction unit 211D may choose a scheduling processing unit 212 that has more radio communication terminal resources not in use as a destination scheduling processing unit 212 for the radio communication terminal resources. By such choosing, throughputs of the scheduling processing units 212 may be distributed.

In the example illustrated in FIGS. 1 and 4, the radio communication terminal resources in the second scheduling processing unit 212-2 corresponding to the second sector S-2 are used for communication with the second through fourth radio communication terminals 3-2 through 3-4. As illustrated in FIG. 4, however, radio communication terminal resources not in use to which transfer from the radio communication terminal resources in use in the first scheduling processing unit 212-1 that is the object of the power saving may be made exist in the second scheduling processing unit 212-2. Then the power saving processing instruction unit 211D chooses the second scheduling processing unit 212-2 as the destination scheduling processing unit 212 for the radio communication terminal resources.

The power saving processing instruction unit 211D instructs the first scheduling processing unit 212-1 to stop transmitting the TAC to the first radio communication terminal 3-1. In addition, the power saving processing instruction unit 211D instructs the first scheduling processing unit 212-1 to make the transfer of the radio communication terminal resources from the first scheduling processing unit 212-1 to the second scheduling processing unit 212-2 (processing P1008 in FIG. 5B).

The first scheduling processing unit 212-1 instructed by the power saving processing instruction unit 211D stops processing for transmitting the TAC to the first radio communication terminal 3-1. With the stop of the transmission of the TAC, the first scheduling processing unit 212-1 stops processing for transmitting the user data to the first radio communication terminal 3-1 (processing P1009).

Once the processing for transmitting the TAC is brought into stopped state by the first scheduling processing unit 212-1 (processing P1010), the time alignment timer is expired without update of the TAC (processing P1011). Then the first scheduling processing unit 212-1 releases the resources such as the PUCCH resources and the SRS resources for the first radio communication terminal 3-1 for the transfer of the radio communication terminal resources (processing P1012). The first scheduling processing unit 212-1 instructs the MAC processing units 2131C-1 of the first layer-2 processing unit 2131-1 to release the HARQ buffer 2131D-1 for temporary storage of uplink data from the radio communication terminal 3 to the radio base station 2 (processing P1013).

The first scheduling processing unit 212-1 transfers scheduling management information managed by the first scheduling processing unit 212-1 to the second scheduling processing unit 212-2 for the transfer of the radio communication terminal resources (processing P1014). As the scheduling management information that is transferred, there may be enumerated identification information on the radio communication terminals 3 managed by the scheduling processing unit 212 that is the object of power saving, amount of resident data that is scheduled to be transmitted to the radio communication terminals 3, and information on discontinuous reception (DRX) status of the radio communication terminals 3, for instance.

The second scheduling processing unit 212-2 receives the scheduling management information transmitted from the first scheduling processing unit 212-1 and performs allocation processing for the radio communication terminal resources for continuance of the communication with the first radio communication terminal 3-1. Then the second scheduling processing unit 212-2 reports to the power saving processing instruction unit 211D completion of processing for the transfer of the radio communication terminal resources (processing P1015).

Once the processing for the transfer of the radio communication terminal resources is completed, the first scheduling processing unit 212-1 turns off power of the first scheduling processing unit 212-1 (processing P1016). The component (the scheduling processing unit 212 in the first embodiment) that is the object of power saving may be powered off based on power-off instruction from the power saving processing instruction unit 211D to the component that is the object of power saving.

The power saving processing instruction unit 211D instructs the second scheduling processing unit 212-2 to start processing for transmitting a TAC to the first radio communication terminal 3-1 (processing P1017 in FIG. 5C). The second scheduling processing unit 212-2 instructs the first layer-1 processing unit 2132-1 to start a random access procedure by physical downlink control channel (PDCCH) order, that is, a non-contention-based random access procedure (processing P1018).

The first layer-1 processing unit 2132-1 having received the instruction from the second scheduling processing unit 212-2 notifies the first radio communication terminal 3-1 of random access preamble numbers by PDCCH order (processing P1019). The first radio communication terminal 3-1 generates a random access preamble from the notified random access preamble numbers and transmits the generated random access preamble to the first layer-1 processing unit 2132-1 (processing P1020).

The RRC processing unit 211A transmits RRC connection reconfiguration to the first radio communication terminal 3-1 through the first layer-2 processing unit 2131-1 and the first layer-1 processing unit 2132-1 (processing P1021). The first radio communication terminal 3-1 having received the RRC connection reconfiguration transmits RRC connection reconfiguration complete. The RRC processing unit 211A receives the RRC connection reconfiguration complete, transmitted from the first radio communication terminal 3-1, through the first layer-1 processing unit 2132-1 and the first layer-2 processing unit 2131-1 (processing P1022). The second scheduling processing unit 212-2 instructs the first layer-2 processing unit 2131-1 to transmit a TAC (processing P1023). The first layer-2 processing unit 2131-1 transmits the TAC through the first layer-1 processing unit 2132-1 to the first radio communication terminal 3-1 (processing P1024). The first radio communication terminal 3-1 adjusts transmission timing for radio signals to the radio base station 2 in accordance with the received TAC and thereby re-establishes the temporal synchronization (processing P1025). Thus the communication between the first radio communication terminal 3-1 and the radio base station 2 is resumed.

Figure 7:
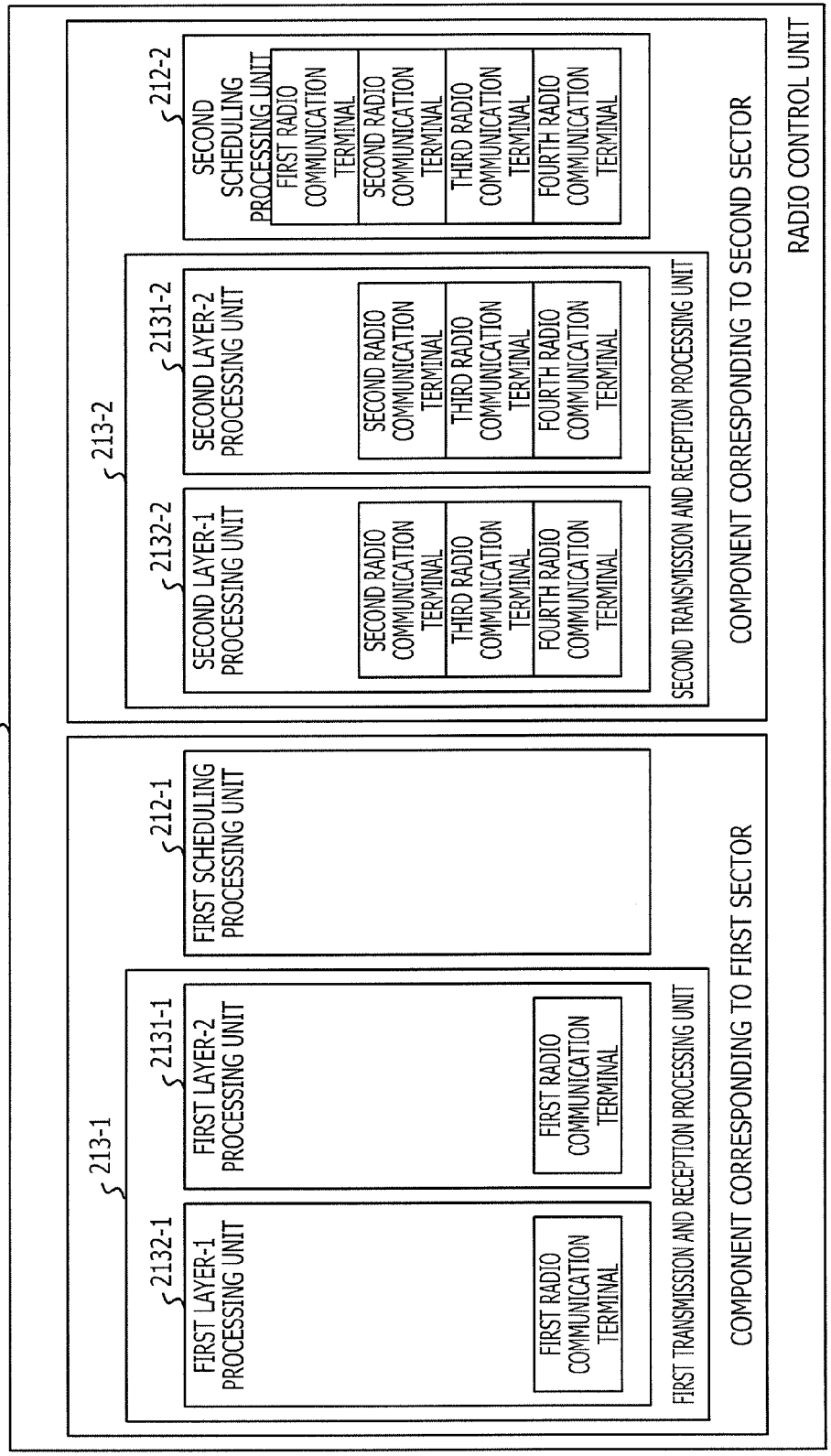
FIG. 7 illustrates the radio communication terminal resources in a state after the performance of the power control processing according to the first embodiment.

FIG. 7 illustrates the radio communication terminal resources in a state after the performance of the power control processing according to the first embodiment. Once the power control processing according to the first embodiment described above with reference to FIG. 5 is performed, the radio communication terminal resources in use for the first scheduling processing unit 212-1 corresponding to the first sector S-1, that is, the first radio communication terminal 3-1 is released. Then the first radio communication terminal 3-1 is allocated to the radio communication terminal resources not in use in the second scheduling processing unit 212-2 corresponding to the second sector S-2. On the other hand, the first layer-1 processing unit 2132-1 and the first layer-2 processing unit 2131-1 that correspond to the first sector S-1 remain holding the first radio communication terminal 3-1. Then the first radio communication terminal 3-1 is connected to the radio base station 2 through the components corresponding to the first sector S-1, except the first scheduling processing unit 212-1 from which the transfer of the radio communication terminal resources has been made. That is, unlike the case in which such handover as described above with reference to FIG. 2 is performed, the first radio communication terminal 3-1 continues to be connected to the radio base station 2 through the first radio unit 22-1 corresponding to the sector S-1 as illustrated in FIG. 1.

According to the radio base station and the power control method according to the first embodiment, as may be understood from above description, the transfer of the radio communication terminal resources is made for individual components corresponding to the sectors and thus flexible power saving for each component may be attained.

According to the radio base station and the power control method according to the first embodiment, the radio communication terminals in the sector corresponding to the component from which the transfer of the radio communication terminal resources has been made are connected to the radio base station through the components corresponding to the same sector after the performance of the power saving. Therefore, unlike the case in which such handover as described above with reference to FIG. 2 is performed, the power saving in the radio base station may be attained without influencing quality of the communication between the radio communication terminals and the radio base station.

According to the radio base station and the power control method according to the first embodiment, furthermore, the power control is carried out independently of the management timer for radio resource control unlike the case in which such handover as described above with reference to FIG. 2 is performed. In the radio base station and the power control method according to the first embodiment, therefore, there is no possibility that the RRC connection re-establishment due to the RRC reconfiguration failure occurs, and the adverse effect of the frequent occurrence of the RRC connection re-establishment on the novel data communication connection may be avoided.

The above description presents the example of the power control method of the first embodiment and does not mean that the power control method of the first embodiment is limited to the above description.

When there is a component (the scheduling processing unit 212 in the first embodiment) which has been powered off by the power control processing described above and for which the power saving has been made, for instance, the power saving processing instruction unit 211D may determine that the radio communication terminal resources of the component for which the power saving has been made are not in use. Then the power saving processing instruction unit 211D may determine whether the transfer of the radio communication terminal resources may be attained or not by comparing the radio communication terminal resources in use in the component that is the object of the power saving and the radio communication terminal resources not in use in other components including the components for which the power saving has been made (processing P1007). When the component for which the power saving has been made is chosen as the component that is the object of the transfer of the radio communication terminal resources, the power saving processing instruction unit 211D may instruct the component for which the power saving has been made to turn on the power of the component.

When the usage of the radio communication terminal resources of another component for the sector corresponding to the component for which the power saving has been made exceeds a specified power saving cancellation threshold, the power saving processing instruction unit 211D may instruct the component for which the power saving has been made to turn on the power of the component. The power saving cancellation threshold is a threshold that is a standard for cancellation of the power saving for the component for which the power saving has been made. Increase in traffic after the power saving may be addressed by such power control.

FIG. 8 is a schematic hardware configuration of the radio base station according to the first embodiment. Reference characters presented in FIG. 8 correspond to reference characters presented in FIG. 3 for the components of the radio base station 2.

As illustrated in FIG. 8, the components in the radio control unit 21 may be processor cores, devices each including a plurality of processor cores, or circuit boards each including a plurality of devices, as appropriate. For instance, the devices may be central processing units (CPU), digital signal processors (DSP), and field programmable gate arrays (FPGA). In the power control method according to the first embodiment, therefore, the power saving for the radio base station may be attained by power-off of the processor cores, the devices, or the circuit boards depending on which of the processor cores, the devices, and the circuit boards are mounted as the components that are the objects of the power saving.

<Second Embodiment>

In the first embodiment, as described above, the power saving for the radio base station is attained by the transfer of the radio communication terminal resources for the scheduling processing unit among the components of the radio base station. The component of the radio base station that is the object of the transfer of the radio communication terminal resources, however, is not limited to the scheduling processing unit and may be another component.

In a second embodiment, power saving for the radio base station is attained by transfer of the radio communication terminal resources for the layer-2 processing unit among the components of the radio base station. Functional configuration of the radio base station according to the second embodiment may be similar to functional configuration of the radio base station 2 according to the first embodiment described above with reference to FIG. 3. Hereinbelow, a power control method according to the second embodiment will be described with use of an example in which the first radio communication terminal 3-1 is connected to the radio base station 2 through a component corresponding to the first sector S-1 and in which the second through fourth radio communication terminals 3-2 through 3-4 are connected to the radio base station 2 through a component corresponding to the second sector S-2, as illustrated in FIGS. 1 and 4.

FIGS. 9A through 9C represent an exemplary power control processing sequence diagram according to the second embodiment.

In the state in which the radio base station 2 and the first radio communication terminal 3-1 are connected as illustrated in FIGS. 1 and 4, the first scheduling processing unit 212-1 instructs the first layer-2 processing unit 2131-1 to transmit a TAC (processing P2001 in FIG. 9A). As described above, TAC is an example of timing command. The scheduling processing unit 212 is an example of the component that may have the function of transmitting timing commands. The first layer-2 processing unit 2131-1 receives the instruction transmitted from the first scheduling processing unit 212-1 and transmits the TAC through the first layer-1 processing unit 2132-1 to the first radio communication terminal 3-1 in accordance with the received instruction (processing P2002). The first radio communication terminal 3-1 adjusts transmission timing for radio signals to the radio base station 2 in accordance with the received TAC and thereby establishes the temporal synchronization (processing P2003).

The first layer-2 processing unit 2131-1 transmits traffic information relating to the first layer-2 processing unit 2131-1 to the call control unit 211 (processing P2004). The second layer-2 processing unit 2131-2 transmits traffic information relating to the second layer-2 processing unit 2131-2 to the call control unit 211 (processing P2005). As is the case with the first embodiment, the traffic information transmitted to the call control unit 211 is information for power saving determination control. In the second embodiment, the information for the power saving determination control is resident amount in the downlink data buffer 2131B, for instance, and is obtained from the following formula (2).

$$Buf\_UE_k = \sum_{n=1}^{MAX\_UE_k} Buf\_UE_n \quad (2)$$

In formula (2), $Buf\_UE_k$ represents buffer resident amount of the downlink data buffer 2131B-k in the layer-2 processing unit 2131-$k$ ($k$ is a number given to the layer-2 processing unit

2131 and an integer in a range from 1 to N). MAX_UE$_k$ is maximum number of the radio communication terminals 3 that the layer-2 processing unit 2131-*k* is capable of processing. Buf_UE$_n$ represents buffer resident amount of the downlink data buffer 2131B-k for the radio communication terminal 3-*n* (n is a number given to the radio communication terminal 3 in the layer-2 processing unit 2131-*k* and an integer in a range from 1 to MAX_UE$_k$) that belongs to the layer-2 processing unit 2131-*k*.

Figure 10:
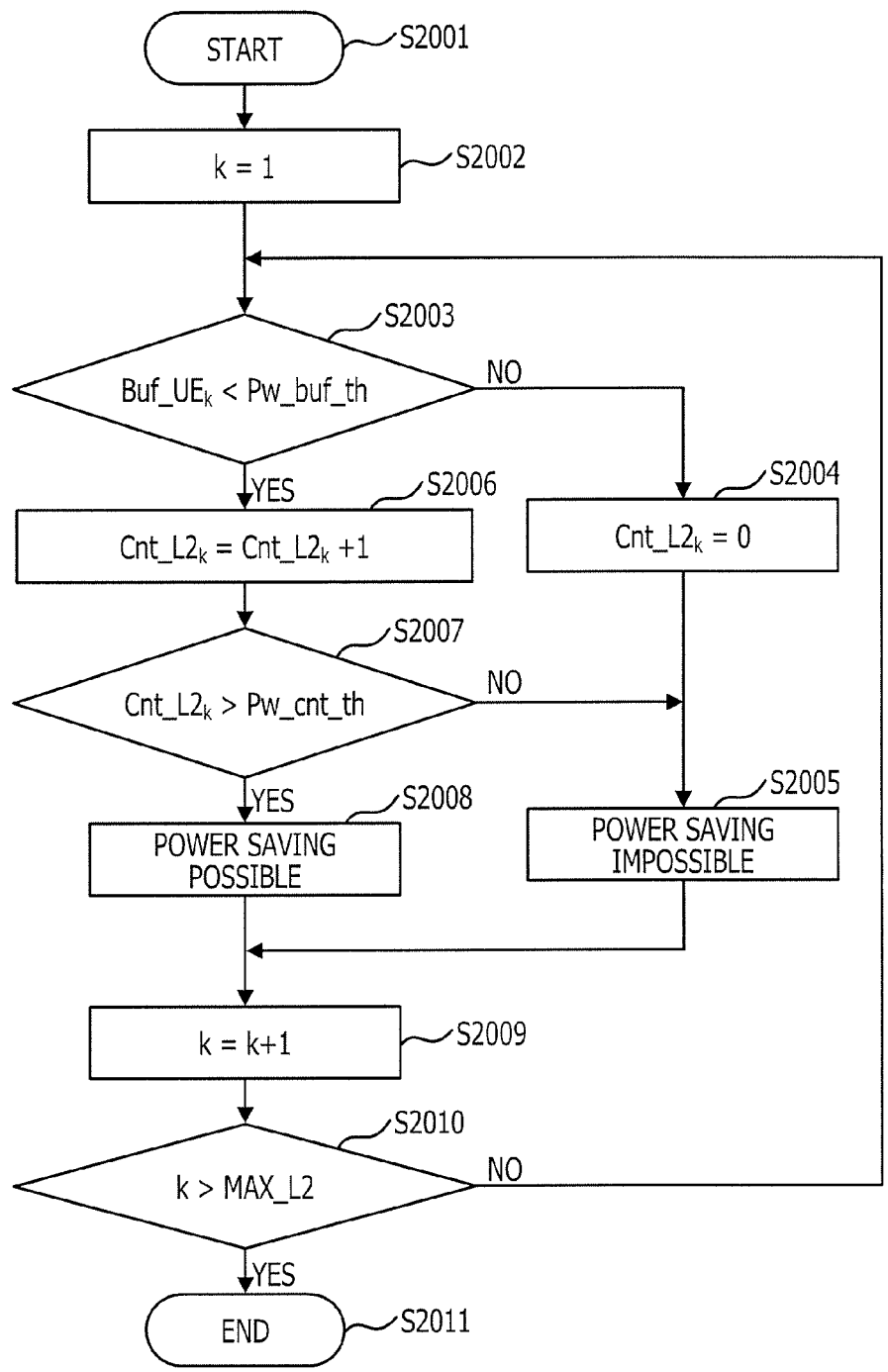
FIG. 10 is an exemplary power saving determination processing flow chart according to the second embodiment.

The power saving determination unit 211C determines whether power saving for each layer-2 processing unit 2131 may be attained or not based on the traffic information received from the layer-2 processing unit 2131 (processing P2006). For instance, the power saving determination unit 211C repetitively performs power saving determination processing illustrated in FIG. 10 with a specified period and thereby determines whether the power saving for the layer-2 processing unit 2131-*k* may be attained or not. FIG. 10 is an exemplary power saving determination processing flow chart according to the second embodiment.

Upon start of the power saving determination processing (step S2001), the power saving determination unit 211C sets the number k of the layer-2 processing unit 2131 to 1 (step S2002) and determines whether the buffer resident amount Buf_UE$_k$ of the downlink data buffer 2131B-k exceeds a specified threshold Pw_buf_th of the buffer resident amount or not (step S2003). The threshold Pw_buf_th of the buffer resident amount is an example of the power saving determination threshold.

If it is determined that the buffer resident amount Buf_UE$_k$ is equal to or larger than the specified threshold Pw_buf_th of the buffer resident amount ("NO" in step S2003), the power saving determination unit 211C sets the power saving determination counter Cnt_SCD$_k$ for the layer-2 processing unit 2131-*k* to 0 (step S2004). Then, the power saving determination unit 211C determines that it is impossible to attain the power saving for the layer-2 processing unit 2131-*k* (step S2005).

If it is determined that the buffer resident amount Buf_UE$_k$ is smaller than the specified threshold Pw_buf_th of the buffer resident amount ("YES" in step S2003), the power saving determination unit 211C increments the power saving determination counter Cnt_L2$_k$ for the layer-2 processing unit 2131-*k* by one (step S2006). Then the power saving determination unit 211C determines whether value of the power saving determination counter Cnt_L2$_k$ exceeds the specified power saving counter threshold Pw_cnt_th or not (step S2007).

If it is determined that the value of the power saving determination counter Cnt_L2$_k$ is equal to or smaller than the specified power saving counter threshold Pw_cnt_th ("NO" in step S2007), the power saving determination unit 211C determines that it is impossible to attain the power saving for the layer-2 processing unit 2131-*k* (step S2005).

If it is determined that the value of the power saving determination counter Cnt_L2$_k$ exceeds the specified power saving counter threshold Pw_cnt_th ("YES" in step S2007), the power saving determination unit 211C determines that the power saving for the layer-2 processing unit 2131-*k* may be attained (step S2008).

With such repetitive performance of the power saving determination processing flow with a specified period, the power saving determination counter Cnt_L2$_k$ is successively incremented and thus exceeds the specified power saving counter threshold Pw_cnt_th, so that the power saving determination unit 211C determines that the power saving for the layer-2 processing unit 2131-*k* may be attained.

Once the processing in step S2005 or the processing in step S2008 is performed, the power saving determination unit 211C increments the number k of the layer-2 processing unit 2131 by one (step S2009). Then the power saving determination unit 211C determines whether value of the incremented number k of the layer-2 processing unit 2131 exceeds maximum value MAX_L2 of the number of the layer-2 processing unit 2131 or not (step S2010).

If it is determined that the value of the incremented number k of the layer-2 processing unit 2131 is equal to or smaller than MAX_L2 ("NO" in step S2010), the power saving determination unit 211C returns to the processing of step S2003 and continues the power saving determination processing.

If it is determined that the value of the incremented number k of the layer-2 processing unit 2131 exceeds the MAX_L2 ("YES" in step S2010), the power saving determination unit 211C ends the power saving determination processing in the period (step S2011).

The power saving determination unit 211C notifies the power saving processing instruction unit 211D of the layer-2 processing unit 2131 for which it is determined through such power saving determination processing as illustrated in FIG. 10 that the power saving may be made (the layer-2 processing unit 2131 that is the object of power saving). In the example illustrated in FIGS. 1 and 4, the first layer-2 processing unit 2131-1 corresponding to the first sector S-1 is used only for the communication with the first radio communication terminal 3-1. In accordance with such power saving determination processing as illustrated in FIG. 10, the power saving determination unit 211C notifies the power saving processing instruction unit 211D of the first layer-2 processing unit 2131-1 as the layer-2 processing unit 2131 that is the object of power saving.

With use of the traffic information (information for the power saving determination control) received from the layer-2 processing units 2131, the power saving processing instruction unit 211D compares the buffer resident amount in the layer-2 processing unit 2131 that is the object of power saving and buffer unused amount in another layer-2 processing unit 2131. Then the power saving processing instruction unit 211D determines whether the transfer of the radio communication terminal resources may be attained or not (processing P2007).

When the buffer unused amount in another layer-2 processing unit 2131 is larger than the buffer resident amount in the layer-2 processing unit 2131 that is the object of power saving, the power saving processing instruction unit 211D may determine that the transfer of the radio communication terminal resources may be attained. When there are a plurality of other layer-2 processing units 2131 that have buffer unused amounts greater than the buffer resident amount in the layer-2 processing unit 2131 that is the object of power saving, the power saving processing instruction unit 211D may choose a layer-2 processing unit 2131 having greater buffer unused amount as the destination layer-2 processing unit 2131 for the radio communication terminal resources.

In the example illustrated in FIGS. 1 and 4, the radio communication terminal resources in the second layer-2 processing unit 2131-2 corresponding to the second sector S-2 are used for communication with the second through fourth radio communication terminals 3-2 through 3-4. As illustrated in FIG. 4, however, radio communication terminal resources not in use to which transfer from the radio communication terminal resources in use in the first layer-2 processing unit 2131-1 that is the object of power saving may be made exist in the second layer-2 processing unit 2131-2. Then the power saving processing instruction unit 211D chooses the second layer-2 processing unit 2131-2 as the destination layer-2 processing unit 2131 for the radio communication terminal resources.

The power saving processing instruction unit 211D instructs the first scheduling processing unit 212-1 to stop the processing for transmitting the TAC to the first radio communication terminal 3-1 (processing P2008 in FIG. 9B). The power saving processing instruction unit 211D instructs the first layer-2 processing unit 2131-1 to perform the transfer of the radio communication terminal resources from the first layer-2 processing unit 2131-1 to the second layer-2 processing unit 2131-2 (processing P2009).

The first scheduling processing unit 212-1 instructed by the power saving processing instruction unit 211D stops the processing for transmitting the TAC to the first radio communication terminal 3-1. With the stop of the processing for transmitting the TAC, the first scheduling processing unit 212-1 stops processing for transmitting user data to the first radio communication terminal 3-1 (processing P2010).

Once the processing for transmitting the TAC is brought into stopped state by the first scheduling processing unit 212-1 (processing P2011), a time alignment timer is expired without update of the TAC (processing P2012). Then the first scheduling processing unit 212-1 releases resources such as PUCCH resources and SRS resources for the first radio communication terminal 3-1 (processing P2013). The first scheduling processing unit 212-1 instructs the MAC processing unit 2131C-1 of the first layer-2 processing unit 2131-1 to release the HARQ buffer 2131D-1 for the transfer of the radio communication terminal resources (processing P2014).

The first layer-2 processing unit 2131-1 transfers management information in the RLC layer and the PDCP layer managed by the first layer-2 processing unit 2131-1 to the second layer-2 processing unit 2131-2 for the transfer of the radio communication terminal resources (processing P2015). As the management information in the RLC layer and the PDCP layer that is transferred, state variable in the RLC layer, and hyper frame number (HFN) and PDCP sequence number (PDCP SN) in the PDCP layer may be enumerated, for instance. Together with the management information in the RLC layer and the PDCP layer, PDCP service data units (PDCP SDU) resident in the downlink buffer 2131B-1 may be transferred from the first layer-2 processing unit 2131-1 to the second layer-2 processing unit 2131-2.

The second layer-2 processing unit 2131-2 receives the management information in the RLC layer and the PDCP layer transmitted from the first layer-2 processing unit 2131-1 and performs allocation processing for the radio communication terminal resources for continuance of communication with the first radio communication terminal 3-1. Then the second layer-2 processing unit 2131-2 reports to the power saving processing instruction unit 211D completion of the processing of the transfer of the radio communication terminal resources (processing P2016).

Once the processing of the transfer of the radio communication terminal resources is completed, the first layer-2 processing unit 2131-1 turns off power of the first layer-2 processing unit 2131-1 (processing P2017). The power of the first layer-2 processing unit 2131-1 may be turned off based on a power-off instruction from the power saving processing instruction unit 211D to the first layer-2 processing unit 2131-1.

The power saving processing instruction unit 211D instructs the first scheduling processing unit 212-1 to start processing for transmitting a TAC to the first radio communication terminal 3-1 (processing P2018 in FIG. 9C). The first scheduling processing unit 212-1 instructs the first layer-1 processing unit 2132-1 to start a random access procedure by PDCCH order (processing P2019).

The first layer-1 processing unit 2132-1 having received the instruction from the first scheduling processing unit 212-1 notifies the first radio communication terminal 3-1 of random access preamble numbers by PDCCH order (processing P2020). The first radio communication terminal 3-1 generates a random access preamble from the notified random access preamble numbers and transmits the generated random access preamble to the first layer-1 processing unit 2132-1 (processing P2021).

The RRC processing unit 211A transmits RRC connection reconfiguration to the first radio communication terminal 3-1 through the second layer-2 processing unit 2131-2 and the first layer-1 processing unit 2132-1 (processing P2022). The first radio communication terminal 3-1 having received the RRC connection reconfiguration transmits RRC connection reconfiguration complete. The RRC processing unit 211A receives the RRC connection reconfiguration complete, transmitted from the first radio communication terminal 3-1, through the first layer-1 processing unit 2132-1 and the second layer-2 processing unit 2131-2 (processing P2023).

The first scheduling processing unit 212-1 instructs the second layer-2 processing unit 2131-2 to transmit a TAC (processing P2024). The second layer-2 processing unit 2131-2 transmits the TAC through the first layer-1 processing unit 2132-1 to the first radio communication terminal 3-1 (processing P2025). The first radio communication terminal 3-1 adjusts transmission timing for radio signals to the radio base station 2 in accordance with the received TAC and thereby re-establishes the temporal synchronization (processing P2026). Thus the communication between the first radio communication terminal 3-1 and the radio base station 2 is resumed.

Figure 11:
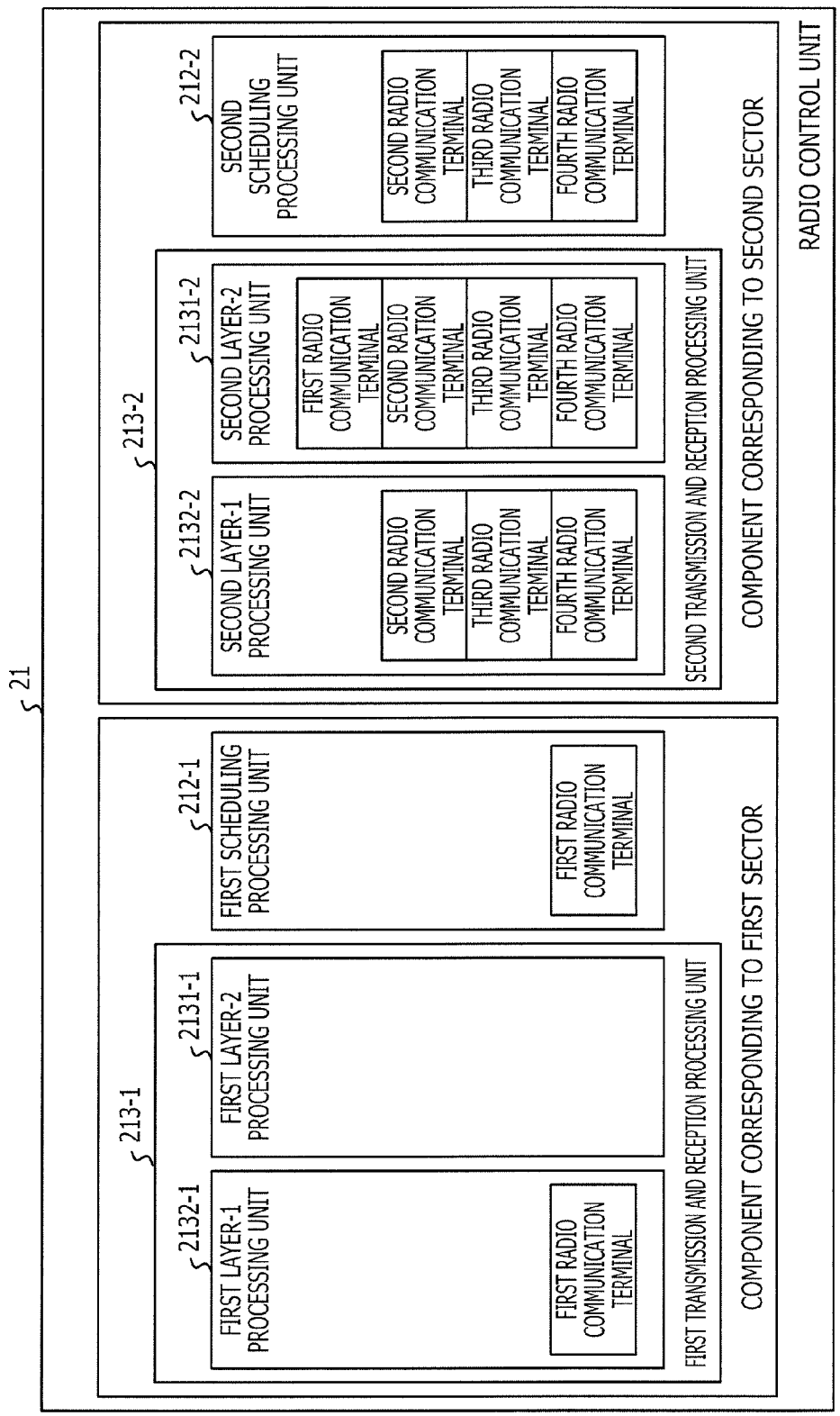
FIG. 11 illustrates the radio communication terminal resources in a state after performance of power control processing according to the second embodiment.

FIG. 11 illustrates the radio communication terminal resources in a state after the performance of the power control processing according to the second embodiment. Once the power control processing according to the second embodiment described above with reference to FIG. 9 is performed, the radio communication terminal resources in use for the first layer-2 processing unit 2131-1 corresponding to the first sector S-1, that is, the first radio communication terminal 3-1 is released. Then the first radio communication terminal 3-1 is allocated to the second layer-2 processing unit 2131-2 corresponding to the second sector S-2. On the other hand, the first scheduling processing unit 212-1 and the first layer-1 processing unit 2132-1 that correspond to the first sector S-1 remain holding the first radio communication terminal 3-1. Then the first radio communication terminal 3-1 is connected to the radio base station 2 through the components corresponding to the first sector S-1, except the first layer-2 processing unit 2131-1 from which the transfer has been made. That is, unlike the case in which such handover as described above with reference to FIG. 2 is performed, the first radio communication terminal 3-1 continues to be connected to the radio base station 2 through the first radio unit 22-1 corresponding to the sector S-1 as illustrated in FIG. 1.

Therefore, the radio base station and the power control method according to the second embodiment may provide effects similar to effects of the radio base station and the power control method according to the first embodiment described above.

The above description presents the example of the power control method of the second embodiment and does not mean that the power control method of the second embodiment is limited to the above description.

Though the example in which the resident amount in the downlink data buffer 2131B is used as the information for the power saving determination control has been described above with reference to FIGS. 9 and 10, for instance, the information for the power saving determination control may be the usage of the radio communication terminal resources for the radio communication terminals 3 in the scheduling processing unit 212, as in the first embodiment. The information for the power saving determination control may be usage of logical channel resources established according to such types of services of the radio communication terminals 3 as voice data, packet data, and image data. In use of such information for the power saving determination control, a configuration in which the information is transmitted from the scheduling processing unit 212 to the call control unit 211 may be adopted.

The power control method according to the first embodiment and the power control method according to the second embodiment are not mutually exclusive and may be combined.

Hardware configuration of the radio base station according to the second embodiment may be similar to the hardware configuration of the radio base station according to the first embodiment described above with reference to FIG. 8. In accordance with the power control method according to the second embodiment, therefore, the power saving for the radio base station may be attained by power-off of processor cores, devices, or circuit boards depending on which of the processor cores, the devices, and the circuit boards are mounted as the components that are the object of the power saving.

<Third Embodiment>

The power control methods in the radio base station that is separated into the radio control unit and the radio units as illustrated in FIGS. 1 and 3 have been described above as the power control methods according to the first embodiment and the second embodiment. The power control methods according to the first embodiment and the second embodiment, however, may similarly be applied to radio base stations in which a radio control unit and radio units are integrated physically or spatially.

Figure 12:
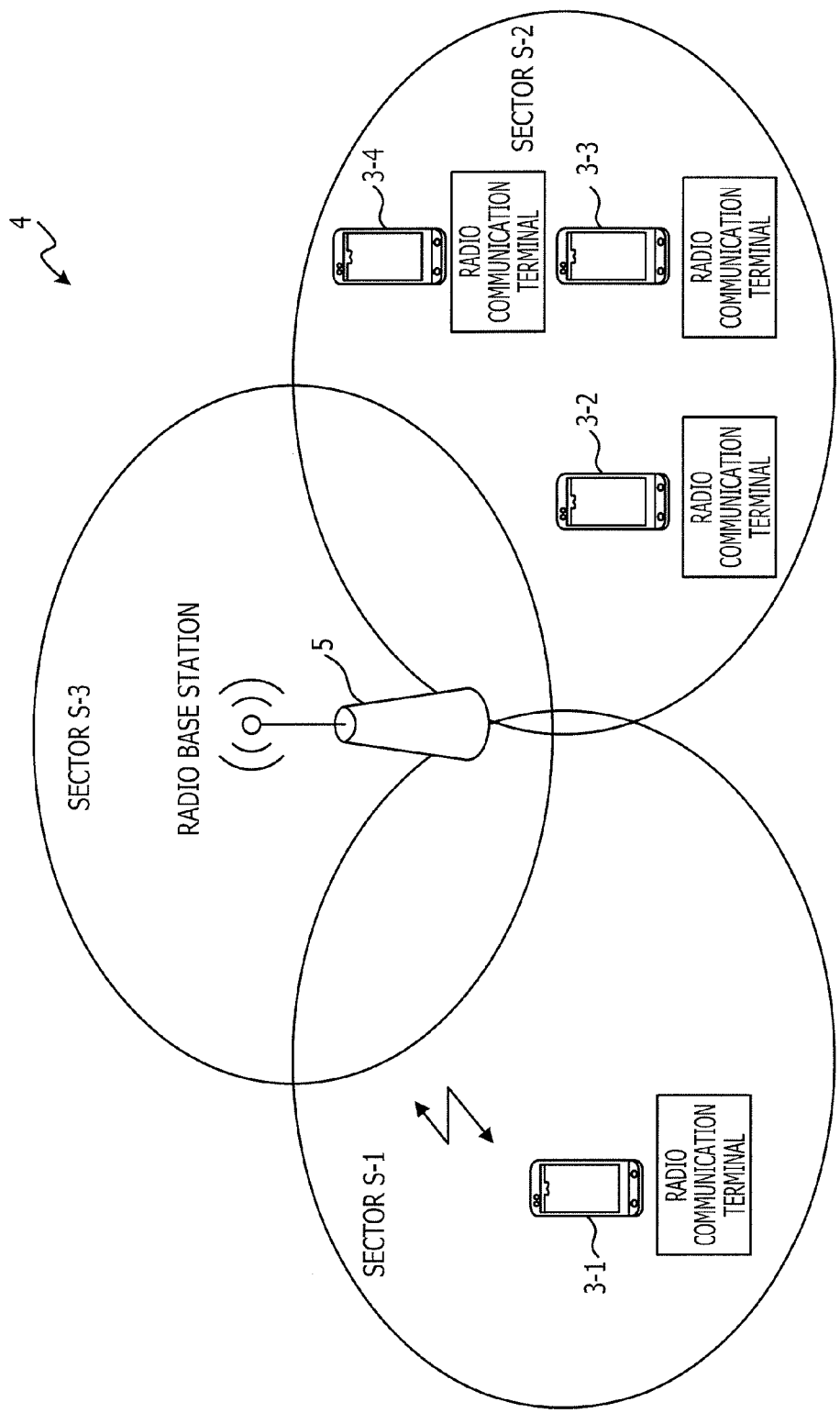
FIG. 12 illustrates an example of a radio communication system according to a third embodiment.

FIG. 12 illustrates an example of a radio communication system according to a third embodiment. As illustrated in FIG. 12, a radio communication system 4 includes a radio base station 5 and radio communication terminals 3 (3-1 through 3-4). The radio communication system 4 conforms to the specifications of 3GPP, for instance. The radio base station 5 is an eNB, for instance. The radio communication terminals 3 are UE, for instance. Though the one radio base station 5 is illustrated in FIG. 12, any desired number of the radio base stations 5 may be included in the radio communication system 4. Though the four radio communication terminals 3-1 through 3-4 are illustrated in FIG. 12, any desired number of the radio communication terminals 3 may be connected to the radio base station 5.

As illustrated in FIG. 12, communication area of the radio base station 5 is divided into the plurality of sectors S (S-1 through S-3). The radio base station 5 is connected to the radio communication terminals 3 located in the sectors S.

Figure 13:
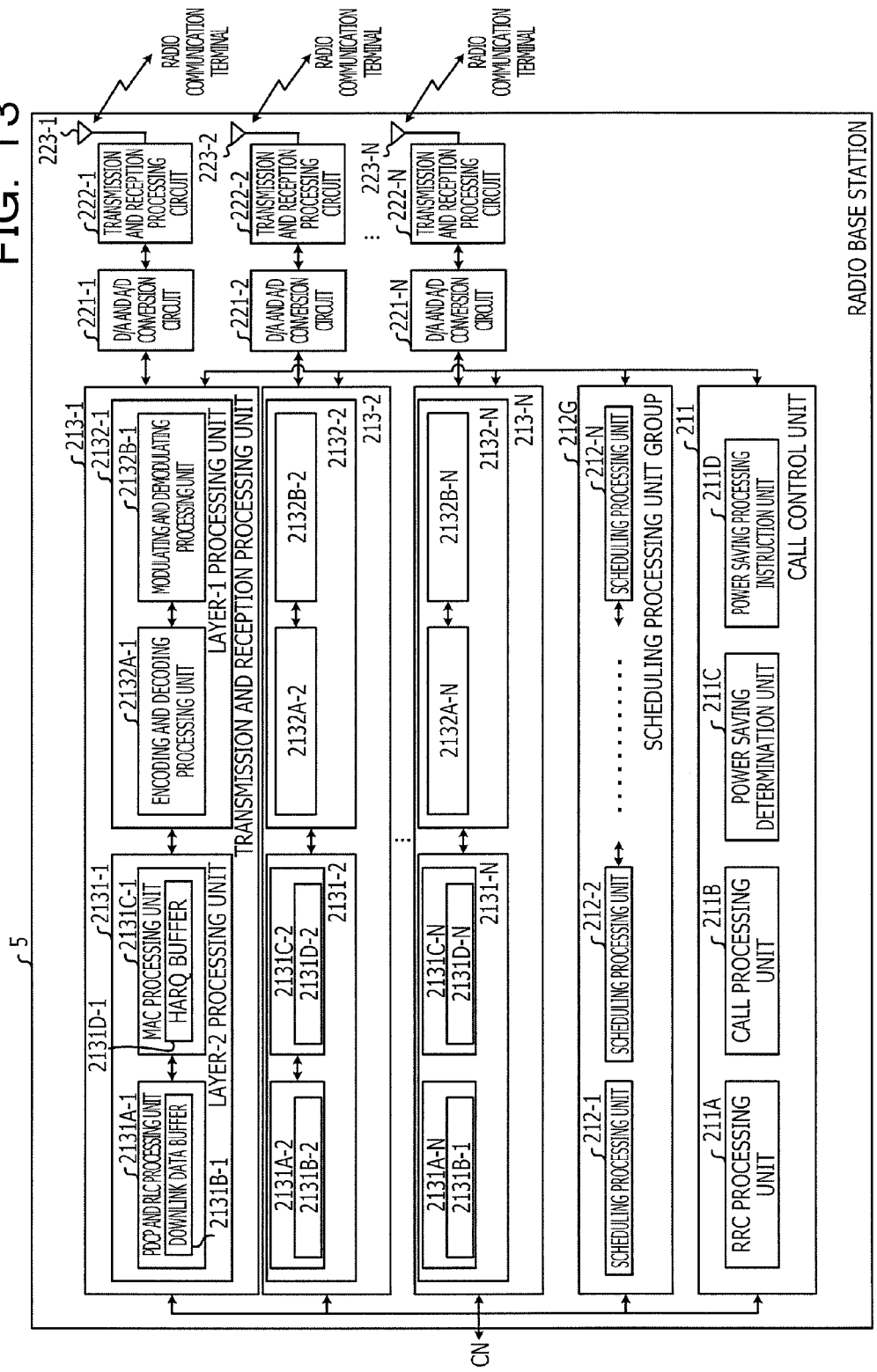
FIG. 13 illustrates an exemplary configuration of a radio base station according to the third embodiment.

FIG. 13 illustrates an exemplary configuration of the radio base station according to the third embodiment. In the radio base station 5 according to the third embodiment illustrated in FIG. 13, the same components as those of the radio base station 2 according to the first and second embodiments described above with reference to FIG. 3 are provided with the same reference characters.

As illustrated in FIG. 13, the radio base station 5 includes components similar to the components of the radio control unit 21 of the radio base station 2. That is, the radio base station 5 includes the call control unit 211, the scheduling processing unit group 212G including the scheduling processing units 212 (212-1 through 212-N) numbered in N, and transmission and reception processing units 213 (213-1 through 213-N) numbered in N. The scheduling processing units 212 numbered in N and the transmission and reception processing units 213 (213-1 through 213-N) numbered in N are the components of the radio base station 5 that respectively correspond to the sectors S covered by the radio base station 5 and numbered in N.

As illustrated in FIG. 13, the radio base station 5 includes components similar to the components of the radio units 22 of the radio base station 2. That is, the radio base station 5 includes the D/A and A/D conversion circuits 221 (221-1 through 221-N), the transmission and reception processing circuits 222 (222-1 through 222-N), and the antennas 223 (223-1 through 223-N). The D/A and A/D conversion circuits 221-1 through 221-N, the transmission and reception processing circuits 222-1 through 222-N, and the antennas 223-1 through 223-N respectively correspond to the sectors S numbered in N.

The power control methods according to the first embodiment and the second embodiment may similarly be applied to the radio base station 5. The radio base station 5 and the power control method according to the third embodiment may provide effects similar to the effects of the radio base station 2 and the power control methods according to the first and second embodiments.

Figure 14:
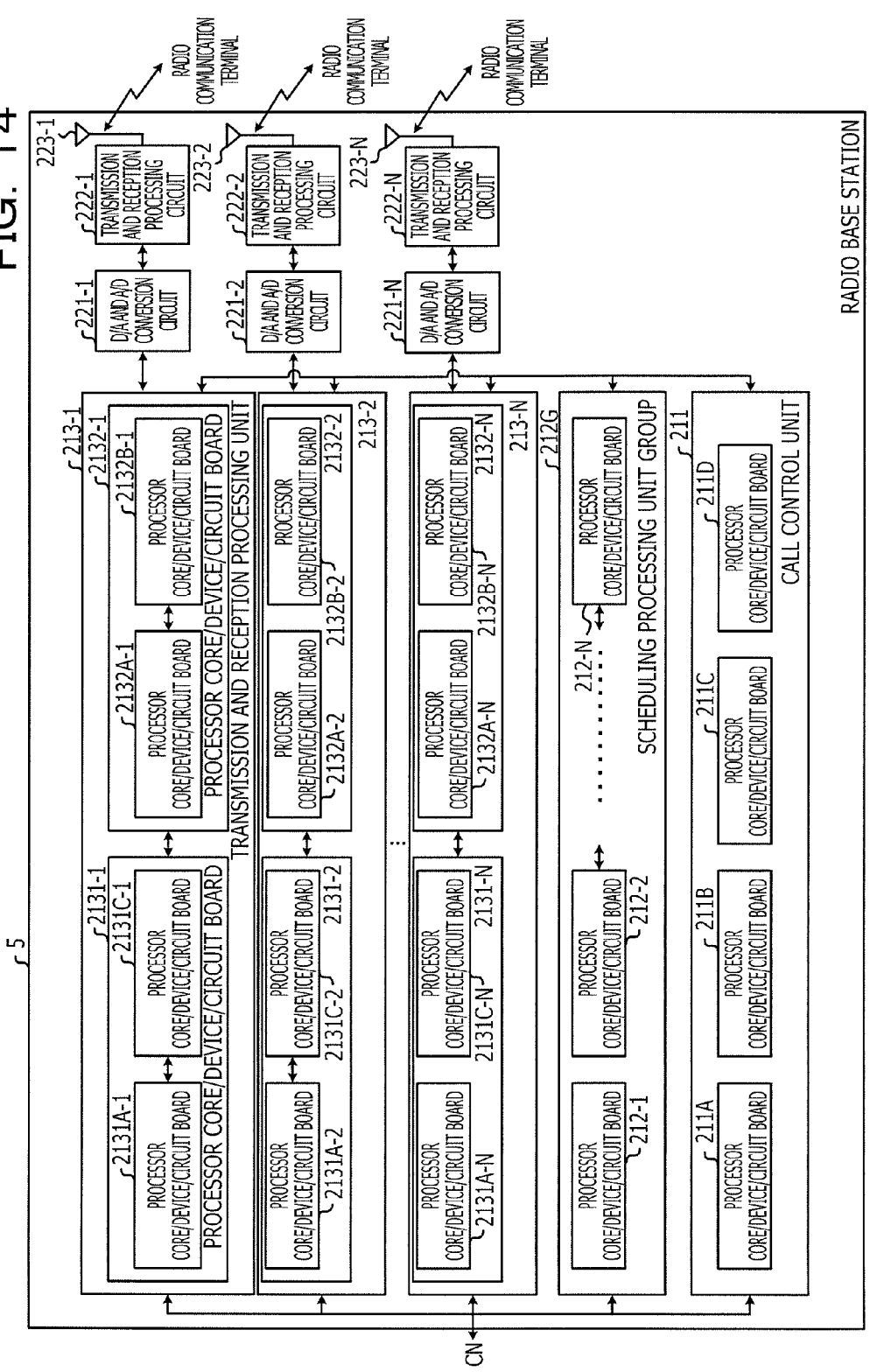
FIG. 14 is a schematic hardware configuration of the radio base station according to the third embodiment.

FIG. 14 is a schematic hardware configuration of the radio base station according to the third embodiment. Reference characters presented in FIG. 14 correspond to reference characters presented in FIG. 13 for the components of the radio base station 5.

As illustrated in FIG. 14, the components of the radio base station 5 corresponding to the radio control unit 21 illustrated in FIG. 3 may be processor cores, devices each including a plurality of processor cores, or circuit boards each including a plurality of devices, as appropriate. For instance, the devices may be CPUs, DSPs, and FPGAs. In accordance with the power control method according to the third embodiment, therefore, the power saving for the radio base station may be attained by power-off of the processor cores, the devices, or the circuit boards depending on which of the processor cores, the devices, and the circuit boards are mounted as the components that are the objects of power saving.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio base station comprising:
    a plurality of communication processing components, each of the plurality of communication processing components being coupled to each of a plurality of antennas respectively, each of the plurality of antennas forming each of a plurality of sectors for a radio communication respectively, each of the plurality of communication processing components including a plurality of communication processors, each of the plurality of communication processors being configured to perform each of a plurality of functions for the radio communication and control each of a plurality of radio resources for each of the plurality of functions respectively; and a control processor configured to select a first communication processing component and a second communication processing component respectively from the plurality of communication processing components, select a first communication processor from the plurality of communication processors in the first communication processing component, transfer a radio resource of the plurality of radio resources that is controlled by the first communication processor to a second communication processor that is in the second communication processing component and performing a same function as the first communication processor, and after transferring the radio resource of the plurality of radio resources, reduce a power of the first communication processor;

wherein the plurality of communication processors includes a scheduling processor and a baseband processor, the scheduling processor is configured to perform scheduling for the radio communication in a corresponding sector, the baseband processor is configured to perform baseband processing for the radio communication in the corresponding sector, and the control processor is configured to select at least one of the scheduling processor and the baseband processor so as to be the first communication processor.

2. The radio base station according to claim 1, wherein the control processor is configured to select the first communication processing component based on each of a plurality of traffic amounts processed by each of the plurality of communication processing components, and to transfer the radio resource controlled by the first communication processor to the second communication processor when the radio resource is less than an unused radio resource controlled by the second communication processor.

3. The radio base station according to claim 2, wherein each of the plurality of traffic amounts is a usage rate of a radio resource controlled by the scheduling processor.

4. The radio base station according to claim 2, wherein each of the traffic amount is an amount of data in a buffer of each of the plurality of communication processing components.

5. The radio base station according to claim 1, wherein the baseband processor includes a first layer processor and a second layer processor, the first layer processor is configured to perform a processing for a first layer of the radio communication, the second layer processor is configured to perform a processing for a second layer of the radio communication.

6. The radio base station according to claim 1, wherein the control processor is configured to stop transmitting a command for adjusting a transmission timing, to a sector corresponding to the first communication processing component for a period, and to transfer the radio resource controlled by the first communication processor to the second communication processor when the period elapses.

7. The radio base station according to claim 1, wherein the transferred radio resource includes a resource of physical uplink control channel (PUCCH) and a resource of sounding reference signal (SRS).

8. The radio base station according to claim 1, wherein each of the plurality of communication processors comprises a circuit board, a device or a processor core.

9. The radio base station according to claim 1, wherein the control processor is configured to select less than all of the plurality of communication processors in the first communication processing component to be the first communication processor.

10. A power control method at a radio base station, the power control method comprising:

selecting a first communication processing component and a second communication processing component respectively from a plurality of communication processing components in the radio base station, each of the plurality of communication processing components being coupled to each of plurality of antennas respectively, each of the plurality of antennas forming each of a plurality of sectors for a radio communication respectively, each of the plurality of communication processing components including a plurality of communication processors, each of the plurality of communication processors being configured to perform each of a plurality of functions for the radio communication and control each of a plurality of radio resources for each of the plurality of functions respectively;

selecting a first communication processor from the plurality of communication processors in the first communication processing component;

transferring a radio resource of the plurality of radio resources that is controlled by the first communication processor to a second communication processor that is in the second communication processing component and performing a same function as the first communication processor; and after transferring the radio resource of the plurality of radio resources, reduce a power of the first communication processor;

wherein the plurality of communication processors includes a scheduling processor and a baseband processor, the scheduling processor is configured to perform scheduling for the radio communication in a corresponding sector, the baseband processor is configured to perform baseband processing for the radio communication in the corresponding sector, and selecting at least one of the scheduling processor and the baseband processor so as to be the first communication processor.

* * * * *